(12) United States Patent
Long et al.

(10) Patent No.: US 12,311,753 B2
(45) Date of Patent: May 27, 2025

(54) CARBON CANISTER WITH DIRECT CONNECT FUEL TANK ISOLATION VALVE

(71) Applicant: Stant USA Corp., Connersville, IN (US)

(72) Inventors: John C. Long, Connersville, IN (US); George J. Mitri, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 12 days.

(21) Appl. No.: 17/968,431

(22) Filed: Oct. 18, 2022

(65) Prior Publication Data

US 2023/0118513 A1   Apr. 20, 2023

Related U.S. Application Data

(60) Provisional application No. 63/257,086, filed on Oct. 18, 2021.

(51) Int. Cl.
*B60K 15/035* (2006.01)
*B60K 15/03* (2006.01)
(Continued)

(52) U.S. Cl.
CPC .. *B60K 15/03519* (2013.01); *B60K 15/03504* (2013.01); *B60K 2015/03447* (2013.01); *B60K 2015/03514* (2013.01); *B60K 2015/03557* (2013.01); *F02M 25/0836* (2013.01); *F16K 31/0655* (2013.01)

(58) Field of Classification Search
CPC ............. F02M 25/089; F02M 25/0836; F02M 25/0854; F02M 2025/0845; B60K 15/03519; B60K 15/03504; B60K 2015/03514; B60K 2015/03585; B60K 2015/03296; B60K 2015/03493; B60K 2015/03523–03557; B60K 2015/03302; B60K 2015/03447; B01D 2253/102; B01D 2259/4566; B01D 2259/4516; Y10S 137/907; F16K 13/00–10; F16K 31/14–145

USPC ................. 123/520, 516, 518, 519; 137/199, 137/493–493.9, 614.16, 907, 507, 354, 137/351, 899, 343; 285/90, 404

See application file for complete search history.

(56) References Cited

U.S. PATENT DOCUMENTS 3,628,517 A    12/1971   Soberski
3,683,597 A *  8/1972    Beveridge .......... F02M 25/0836
                                                        55/513

(Continued)

FOREIGN PATENT DOCUMENTS

CN    205654455      10/2016
CN    206071758 U     4/2017
(Continued)

OTHER PUBLICATIONS

Translation KR100648080 (Year: 2006).*
(Continued)

*Primary Examiner* — Craig J Price
(74) *Attorney, Agent, or Firm* — Barnes & Thornburg

(57) ABSTRACT

A fuel tank vent valve includes a venting apparatus for regulating discharge of fuel vapor from a fuel tank and admission of outside air into a fuel tank. The vent valve is used to regulate pressure in a fuel tank.

16 Claims, 10 Drawing Sheets

(51) Int. Cl.
*F02M 25/08* (2006.01)
*F16K 31/06* (2006.01)

(56) References Cited

U.S. PATENT DOCUMENTS

| | | | |
|---|---|---|---|
| 3,741,232 A | 6/1973 | Soberski | |
| 4,137,882 A * | 2/1979 | Thornburgh | F02M 25/0854 123/520 |
| 4,149,504 A * | 4/1979 | Walters | F02M 25/0854 137/907 |
| 4,193,383 A | 3/1980 | Rogers | |
| 4,203,401 A | 5/1980 | Kingsley et al. | |
| 4,280,466 A * | 7/1981 | Walters | F02M 25/0854 123/520 |
| 4,308,842 A * | 1/1982 | Watanabe | F02M 25/089 123/519 |
| 4,541,396 A * | 9/1985 | Sato | F02M 25/0836 123/518 |
| 5,148,720 A * | 9/1992 | Swenson, Sr. | F16H 61/143 411/389 |
| 5,501,198 A * | 3/1996 | Koyama | F02M 25/0809 123/198 D |
| 5,623,911 A * | 4/1997 | Kiyomiya | F02M 25/0854 123/520 |
| 5,632,251 A * | 5/1997 | Ishikawa | F02M 25/0854 123/519 |
| 5,809,978 A | 9/1998 | Krimmer et al. | |
| 5,878,729 A * | 3/1999 | Covert | F02M 25/0836 123/520 |
| 5,996,559 A * | 12/1999 | Busato | F02M 35/10144 123/184.21 |
| 6,073,617 A * | 6/2000 | Busato | F02M 35/10144 123/184.21 |
| 6,085,615 A * | 7/2000 | Kirkendall | F16H 61/0009 74/606 R |
| 6,170,516 B1 * | 1/2001 | Sakata | F02M 25/0836 251/129.15 |
| 6,230,585 B1 * | 5/2001 | Bator | F16H 61/0009 248/300 |
| 6,328,021 B1 | 12/2001 | Perry et al. | |
| 6,431,156 B1 * | 8/2002 | Murakami | F02M 25/08 123/520 |
| 6,450,153 B1 | 9/2002 | Perry | |
| 6,453,942 B1 | 9/2002 | Perry | |
| 6,460,566 B1 | 10/2002 | Perry et al. | |
| 6,470,861 B1 | 10/2002 | Perry | |
| 6,470,908 B1 | 10/2002 | Perry | |
| 6,474,313 B1 | 11/2002 | Perry et al. | |
| 6,474,314 B1 | 11/2002 | Perry et al. | |
| 6,478,045 B1 | 11/2002 | Perry | |
| 6,484,555 B1 | 11/2002 | Perry et al. | |
| 6,502,560 B1 | 1/2003 | Perry | |
| 6,505,514 B1 | 1/2003 | Perry | |
| 6,514,326 B1 | 2/2003 | Hara et al. | |
| 6,585,230 B2 | 7/2003 | Perry | |
| 6,623,012 B1 | 9/2003 | Perry et al. | |
| 6,701,901 B2 | 3/2004 | Perry et al. | |
| 6,739,573 B1 | 5/2004 | Balsdon | |
| 6,840,232 B2 | 1/2005 | Perry | |
| 6,863,095 B2 | 3/2005 | Osaki et al. | |
| 6,878,194 B2 * | 4/2005 | Hoffman | B01D 53/261 96/147 |
| 6,910,500 B2 | 6/2005 | Perry et al. | |
| 6,983,641 B1 | 1/2006 | Perry et al. | |
| 7,025,084 B2 | 4/2006 | Perry et al. | |
| 7,040,301 B2 | 5/2006 | Perry et al. | |
| 7,100,305 B2 * | 9/2006 | Hoffman | B60T 17/004 96/147 |
| 7,225,798 B2 | 6/2007 | Wang et al. | |
| 7,249,595 B2 | 7/2007 | Mills et al. | |
| 7,472,694 B2 | 1/2009 | King | |
| 7,493,894 B2 * | 2/2009 | Davis | B60K 15/03504 220/749 |
| 7,527,044 B2 * | 5/2009 | Dunkle | F02M 25/0854 123/519 |
| 7,530,348 B2 * | 5/2009 | Wang | F02M 25/0836 123/518 |
| 8,578,914 B2 | 11/2013 | Lee et al. | |
| 9,031,721 B2 | 5/2015 | Fukui et al. | |
| 9,145,051 B2 | 9/2015 | Dudar et al. | |
| 9,163,592 B2 | 10/2015 | Kim et al. | |
| 9,216,646 B2 | 12/2015 | Yang et al. | |
| 9,217,397 B2 | 12/2015 | Peters et al. | |
| 9,243,592 B2 | 1/2016 | Dudar et al. | |
| 9,322,342 B2 | 4/2016 | Dudar et al. | |
| 9,359,977 B2 * | 6/2016 | Brock | F02M 25/0872 |
| 9,376,969 B2 | 6/2016 | Yang et al. | |
| 9,415,680 B2 | 8/2016 | Dudar et al. | |
| 9,429,114 B2 | 8/2016 | Karra et al. | |
| 9,599,071 B2 | 3/2017 | Dudar | |
| 9,669,825 B1 | 6/2017 | Dudar | |
| 9,683,525 B2 | 6/2017 | Koller et al. | |
| 9,746,013 B2 * | 8/2017 | Talley | F16M 13/02 |
| 9,834,205 B1 | 12/2017 | Dudar | |
| 10,024,281 B2 * | 7/2018 | Lohr | F02M 35/10255 |
| 10,167,823 B2 | 1/2019 | Dudar | |
| 10,183,660 B2 | 1/2019 | Dudar | |
| 10,458,366 B2 | 10/2019 | Brock et al. | |
| 10,544,874 B2 * | 1/2020 | Hentschel | F16K 27/029 |
| 10,549,628 B2 | 2/2020 | Hagen | |
| 10,611,625 B2 | 4/2020 | Dudar | |
| 10,717,488 B2 * | 7/2020 | Tani | B62J 35/00 |
| 10,850,609 B2 | 12/2020 | Vulkan et al. | |
| 10,907,583 B2 | 2/2021 | Honda et al. | |
| 11,215,147 B2 * | 1/2022 | Brock | F02M 25/0854 |
| 2006/0207576 A1 | 9/2006 | Mills et al. | |
| 2008/0223343 A1 | 9/2008 | Ammermann | |
| 2009/0101119 A1 | 4/2009 | Ammermann | |
| 2009/0255516 A1 * | 10/2009 | Matsumoto | F16K 27/029 123/520 |
| 2011/0203947 A1 | 8/2011 | Ogawa | |
| 2014/0150661 A1 | 6/2014 | Himmel | |
| 2014/0345709 A1 | 11/2014 | Jefford et al. | |
| 2016/0186700 A1 | 6/2016 | Nishiura | |
| 2016/0245238 A1 | 8/2016 | Ueda | |
| 2018/0119650 A1 | 5/2018 | Brock et al. | |
| 2019/0084410 A1 | 3/2019 | Bhandari et al. | |
| 2019/0249624 A1 | 8/2019 | Seki | |
| 2019/0368431 A1 | 12/2019 | Dudar | |
| 2021/0254583 A1 | 8/2021 | Brock et al. | |
| 2023/0008621 A1 * | 1/2023 | Long | F02M 25/0836 |
| 2023/0213105 A1 * | 7/2023 | Bhandari | F16K 31/10 137/487.5 |

FOREIGN PATENT DOCUMENTS

| | | |
|---|---|---|
| CN | 206206017 U | 5/2017 |
| CN | 206338141 U | 7/2017 |
| CN | 206436819 U | 8/2017 |
| CN | 104582992 B | 11/2017 |
| CN | 108035826 A | 5/2018 |
| CN | 110385981 A | 10/2019 |
| CN | 209539471 U | 10/2019 |
| CN | 111439113 A | 7/2020 |
| CN | 211422789 | 9/2020 |
| CN | 111927959 A | 11/2020 |
| CN | 109458276 B | 12/2020 |
| CN | 212672413 U | 3/2021 |
| CN | 213838792 U | 7/2021 |
| JP | 2001020810 A | 1/2001 |
| JP | 2006258101 | 9/2006 |
| KR | 10-0648080 B1 | 12/2006 |
| KR | 1020210057508 | 5/2021 |

OTHER PUBLICATIONS

PCT International Search Report and Written Opinion completed by the ISA/KR on Feb. 13, 2023 and issued in connection with PCT/US2022/046996.

(56) References Cited

OTHER PUBLICATIONS

PCT International Search Report and Written Opinion completed by the ISA/KR on Feb. 13, 2023 and issued in connection with PCT/US2022/046995.

PCT International Search Report and Written Opinion completed by the ISA/KR on Feb. 13, 2023 and issued in connection with PCT/US2022/046999.

* cited by examiner

CARBON CANISTER WITH DIRECT CONNECT FUEL TANK ISOLATION VALVE

PRIORITY CLAIMS

This application claims priority under 35 U.S.C. § 119 (e) to U.S. Provisional Application Ser. No. 63/257,086, filed Oct. 18, 2021, which is expressly incorporated by reference herein.

BACKGROUND

The present disclosure relates to fuel tank vent valves, and particularly to venting apparatus for regulating discharge of fuel vapor from a fuel tank and admission of outside air into the fuel tank. More particularly, the present disclosure relates to a fuel tank pressure regulator including a fuel tank vent valve.

Vehicle fuel systems include valves associated with a fuel tank and configured to vent pressurized or displaced fuel vapor from the vapor space in the fuel tank to a fuel-vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

The vapor recovery canister is also coupled to a vehicle engine and to a purge vacuum source. Typically, vacuum is applied to the vapor recovery canister by the purge vacuum source whenever the vehicle engine is running in an effort to suck hydrocarbons captured and stored in the canister into the engine for combustion.

SUMMARY

A tank venting system in accordance with the present disclosure includes a canister housing shaped to include a media storage body defining a storage cavity that contains a carbon bed, a fuel tank isolation valve assembly having a fuel tank isolation valve to regulate flow of fuel vapor between a fuel tank and the storage cavity of the canister housing, and valve assembly coupling means for coupling the fuel tank isolation valve assembly to the canister housing. The canister housing, or fuel-vapor recovery canister, is in fluid communication between the fuel tank and an engine in the vehicle to absorb hydrocarbons in the fuel vapor flowing into and out of the fuel tank. The flow of fuel vapor is controlled to maintain the pressure of fuel vapor in the fuel tank at a certain pressure level or within a certain pressure range.

In the illustrative embodiments, the fuel tank isolation valve assembly includes a valve housing and the fuel tank isolation valve. The valve housing is formed to define a fuel fuel-tank vapor port adapted to be coupled in fluid communication with the fuel tank and a vapor-transfer passageway in fluid communication with the fuel fuel-tank vapor port. The fuel tank isolation valve is located in the vapor-transfer passageway to regulate flow of fuel vapor between the fuel tank and the storage cavity.

In the illustrative embodiment, the valve assembly coupling means is provided between the valve housing and the storage body closure. The valve assembly coupling means is provided between the valve housing and the storage body closure to couple the fuel tank isolation valve assembly to the canister housing so that the vapor-transfer passageway of the valve housing is in direct fluid communication with the storage cavity of the canister housing.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
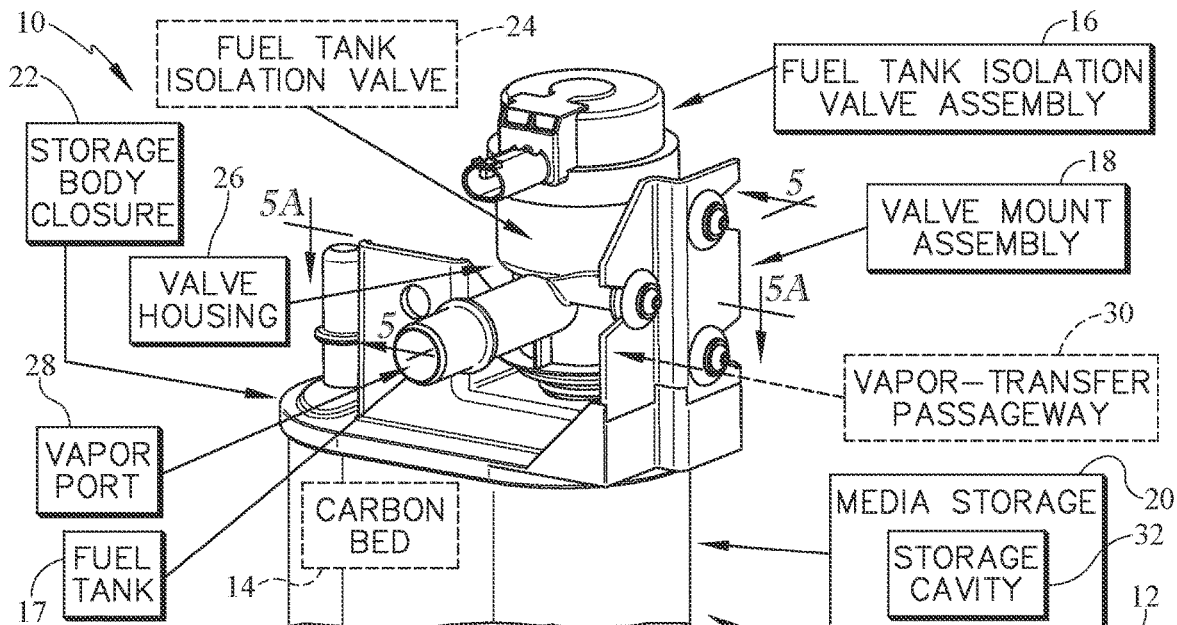
FIG. 1 is a diagrammatic perspective view of a tank venting system in accordance with the present disclosure comprising a canister housing shaped to include a media storage body defining a storage cavity that contains a carbon bed and a storage body closure coupled to the storage body to close a top opening to the storage cavity, a fuel tank isolation valve assembly having a fuel tank isolation valve to regulate flow of fuel vapor between a fuel tank and the storage cavity of the canister housing, and valve assembly coupling means for coupling the fuel tank isolation valve assembly directly to the canister housing.

A fuel tank venting system 10 comprises a canister housing 12 having a storage cavity 32 containing a carbon bed 14, a fuel tank isolation valve assembly 16, and valve assembly coupling means 18 for coupling the fuel tank isolation valve assembly 16 directly to the canister housing 12 as shown in FIGS. 1-5. Canister housing 12 is shaped to include a media storage body 20 defining storage cavity 32 that contains the carbon bed 14 and a storage body closure 22 coupled to storage body 20 to close a top opening 320 to storage cavity 32. Fuel tank isolation valve assembly 16 includes a fuel tank isolation valve 24 to regulate flow of fuel vapor between a fuel tank 17 and storage cavity 32 of canister housing 12.

Fuel tank isolation valve assembly 16 further includes a valve housing 26 as shown in FIG. 2-7. Valve housing 26 is formed to define a fuel-tank vapor port 28 and a vapor-transfer passageway 30. Fuel-tank vapor port 28 is adapted to be coupled in fluid communication with fuel tank 17. Vapor-transfer passageway 30 is in fluid communication with fuel-tank vapor port 28. In the illustrative embodiment, fuel tank isolation valve 24 is located in vapor-transfer passageway 30 to regulate flow of fuel vapor between fuel tank 17 and storage cavity 32.

Figure 2:
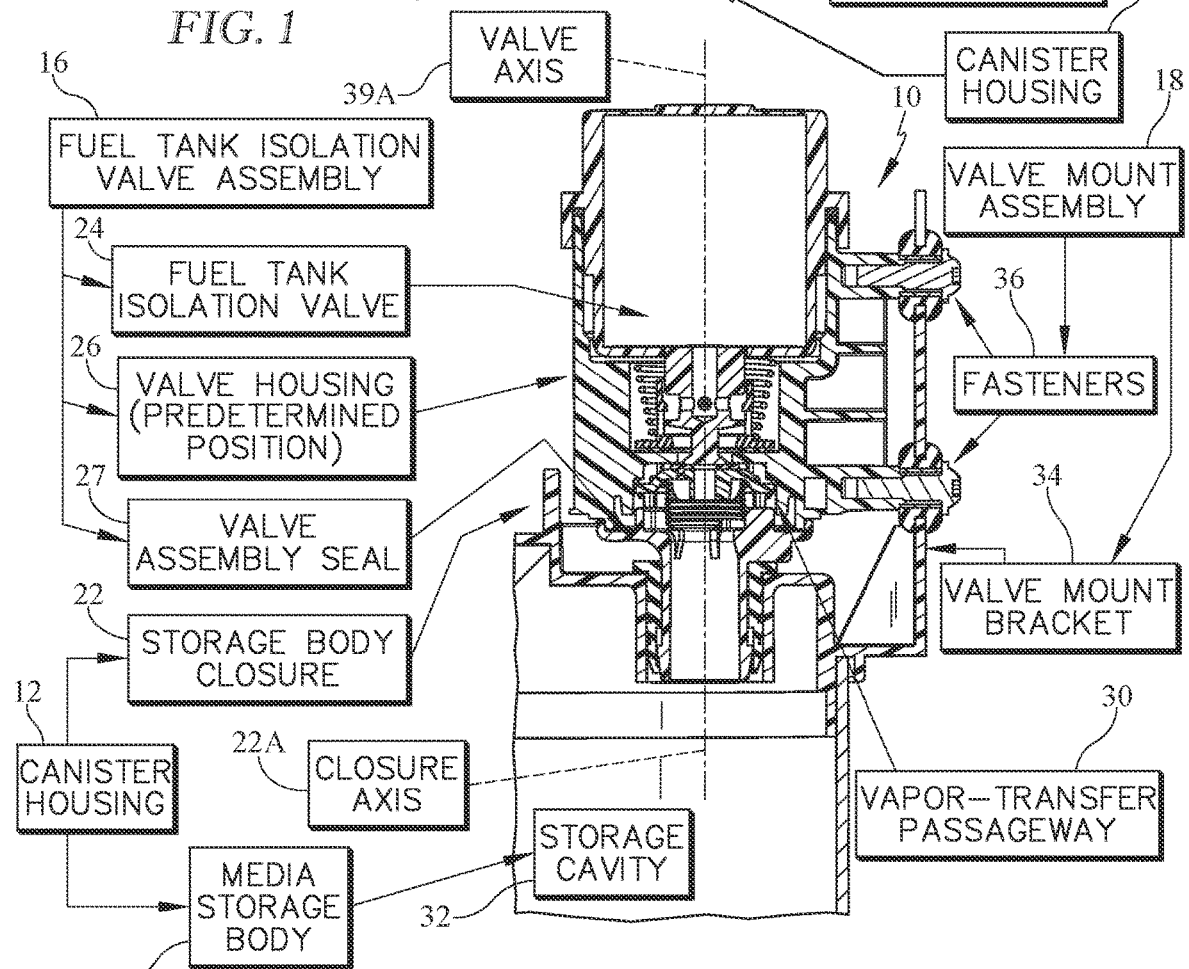
FIG. 2 is sectional side view of the tank venting system of FIG. 1 showing the fuel tank isolation valve assembly further includes a valve housing formed to define a fuel-tank vapor port adapted to be coupled in fluid communication with the fuel tank and a vapor-transfer passageway in fluid communication with the fuel-tank vapor port that extends axially relative to a valve axis, the fuel tank isolation valve is located in the vapor-transfer passageway to regulate flow of fuel vapor between the fuel tank and the storage cavity, and further showing the valve assembly coupling means is provided between the valve housing and the storage body closure to couple the fuel tank isolation valve assembly to the canister housing in a fixed predetermined position relative to the storage body closure in which the valve axis of the fuel tank isolation valve assembly overlaps a closure axis of the storage body closure so that the vapor-transfer passageway of the valve housing is in fluid communication with the storage cavity of the canister housing and the valve housing is blocked from tilting and rotating about the valve axis relative to the storage body closure to reduce wear on a valve assembly seal between the valve housing and the storage body closure.
Figure 7:
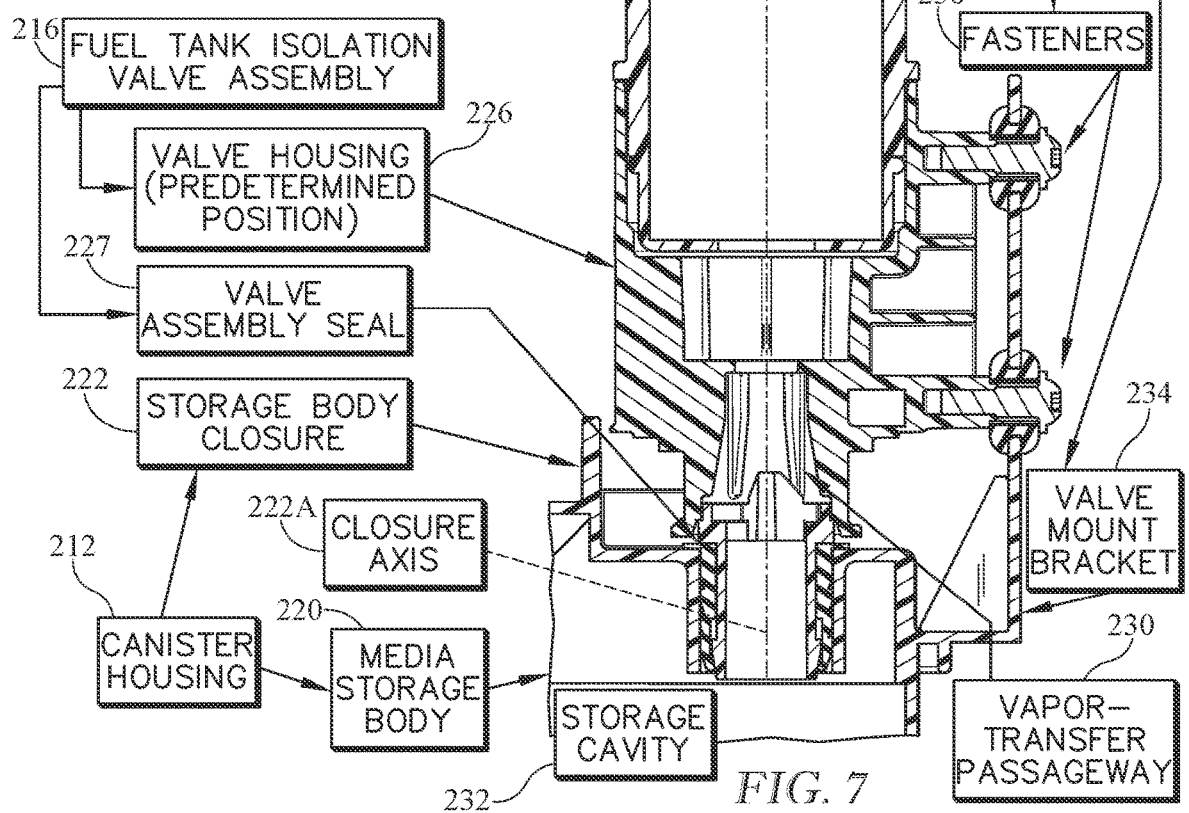
FIG. 7 is sectional side view of the tank venting system of FIG. 6 showing the valve housing of the fuel tank isolation valve assembly includes a valve housing body shaped to define the fuel-tank vapor port and a portion of the vapor-transfer passageway and a bottom mount member shaped to define another portion of the vapor-transfer passageway, and further showing the valve assembly coupling means is provided by a valve mount bracket included in the storage body closure and a plurality of fasteners configured to extend through the valve mount bracket into the valve housing of the fuel tank isolation valve assembly to fix the fuel tank isolation valve assembly relative to the storage body closure in the predetermined position as shown in FIG. 9.
Figure 8:
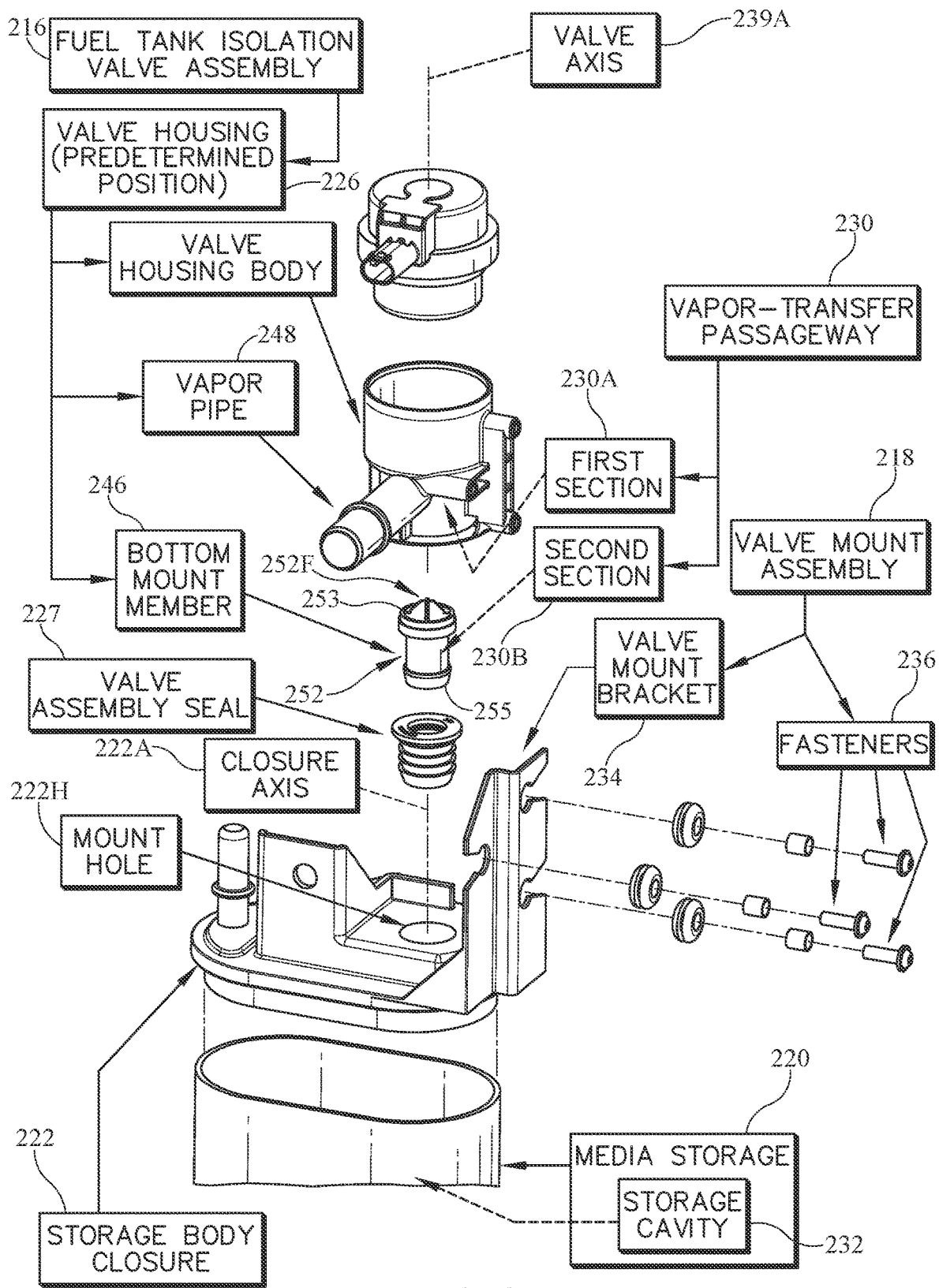
FIG. 8 is an exploded perspective view of the tank venting system of FIG. 6 showing the valve housing of the fuel tank isolation valve assembly includes the valve housing body, the bottom mount member, a valve assembly seal, and further showing bottom mount member includes a first of the bottom mount member configured to be inserted into a bottom opening of the valve housing body and a second end configured to be inserted into a mount hole formed in the storage body closure so that the vapor-transfer passageway is in fluid communication with the storage cavity as shown in FIG. 9.

Valve assembly coupling means 18 is provided between valve housing 26 and storage body closure 22 to couple fuel tank isolation valve assembly 16 to canister housing 12 so that vapor-transfer passageway 30 of valve housing 26 is in direct fluid communication with storage cavity 32 of canister housing 12 as shown in FIGS. 2 and 7. In this way, no hosing or pipes needs to be used to connect fuel tank isolation valve 24 to canister housing 12. Rather, vapor-transfer passageway 30 of valve housing 26 opens directly into storage cavity 32 of canister housing 12 so as to interconnect storage cavity 32 and vapor port 28.

Vapor-transfer passageway 30 is arranged to interconnect storage cavity 32 and vapor port 28 to enable transfer fuel vapor flowing from fuel tank 17 through vapor port 28 to storage cavity 32 of media storage body 20 and to enable transfer of hydrocarbon-laden vapor flowing from storage cavity 32 of media storage body 20 through vapor port 28 to fuel tank 17. Fuel tank isolation valve 24 is located in vapor-transfer passageway 30 so as to regulate flow of fuel vapor in vapor-transfer passageway 30 between vapor port 28 and storage cavity 32 of media storage body 20. Fuel tank isolation valve 24 is used onboard a vehicle (not shown) including an engine and a purge vacuum source (not shown) coupled to the engine and the media storage body.

Valve assembly coupling means 18 also fixes valve housing 26 of fuel tank isolation valve assembly 16 directly to storage body closure 22 of canister housing 12 with valve housing 26 located in a predetermined position relative to storage body closure 22 of canister housing 12 as shown in FIGS. 2 and 7. In the predetermined position, valve housing 26 extends into a mount hole 22H formed in storage body closure 22 to cause vapor-transfer passageway 30 of valve housing 26 to be in fluid communication with storage cavity 32 of canister housing 12 and to cause a valve axis 39A of fuel tank isolation valve assembly 16 to overlap with a closure axis 22A of storage body closure 22.

Figure 5:
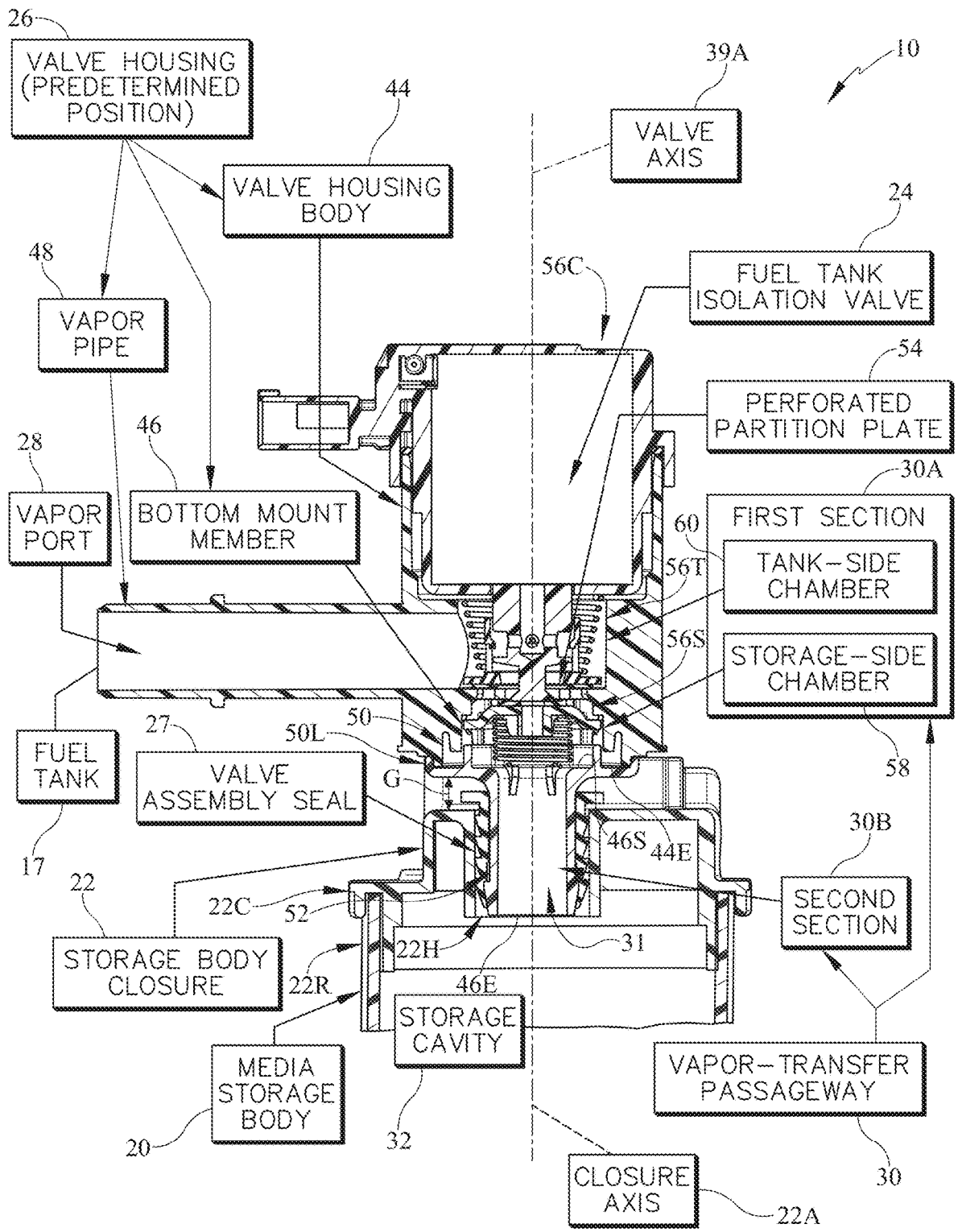
FIG. 5 is a sectional side elevation view taken along line 5-5 of FIG. 1 showing the fuel tank isolation valve includes a perforated partition plate that divides the vapor-transfer passageway to form a tank-side chamber that opens directly into the fuel-tank vapor port and a storage-side chamber that opens into the storage cavity of the media storage body and multi-stage flow controller components located in the chambers that are able to move relative to the stationary perforated partition plate to regulate flow of fuel vapor between the fuel tank and the media storage body.
Figure 5A:
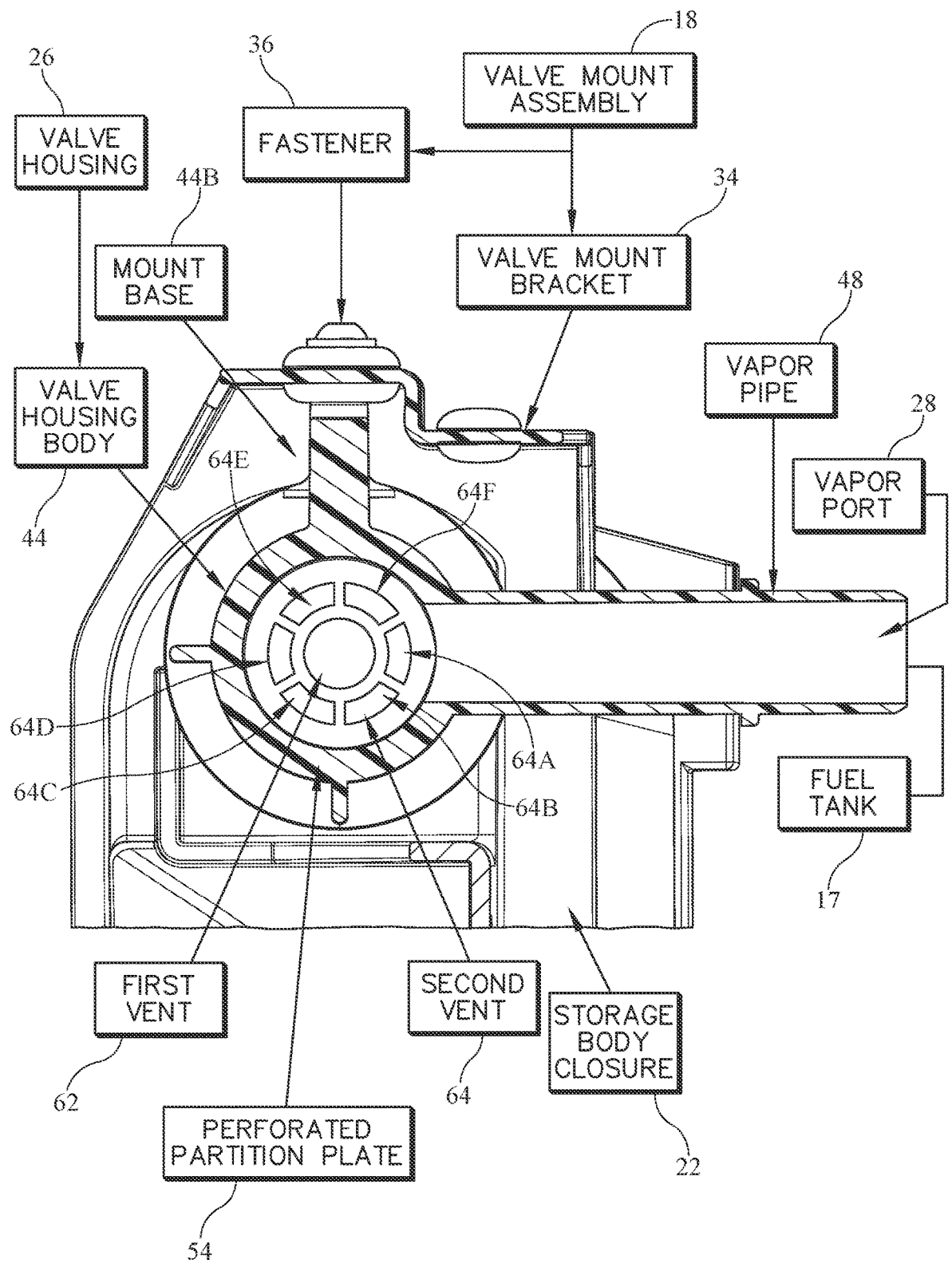
FIG. 5A is an enlarged sectional view taken along line 5A-5A of FIG. 1 showing that the stationary perforated partition plate is formed to include a large-diameter central vent aperture establishing the first vent and six relatively smaller oblong arc-shaped orbital vent apertures surrounding the central vent aperture and establishing the second vent.
Figure 6:
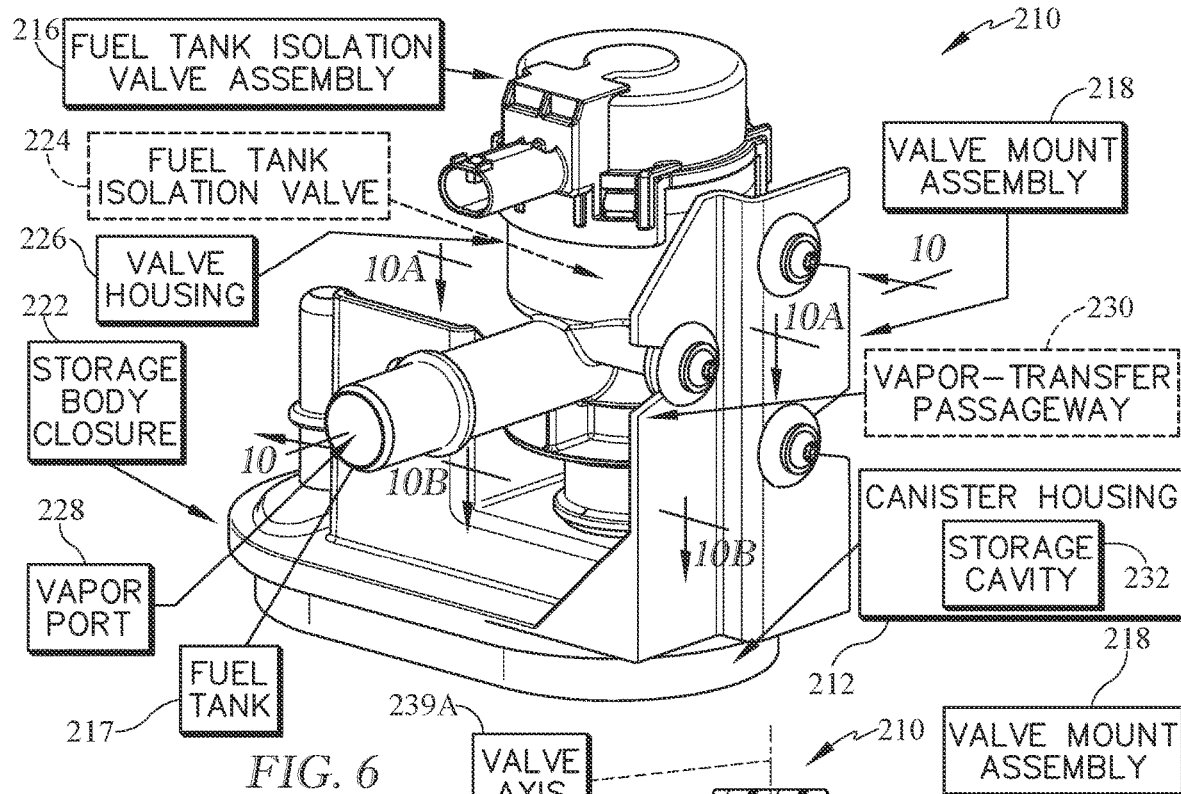
FIG. 6 is a diagrammatic perspective view of another embodiment of a tank venting system in accordance with the present disclosure comprising a canister housing shaped to include a media storage body that defines a storage cavity and a storage body closure coupled to the storage body to close the storage cavity, a fuel tank isolation valve assembly including an elongated valve housing compared to the embodiment in FIGS. 1-5 and a fuel tank isolation valve arranged in the valve housing to regulate flow of fuel vapor between a fuel tank and the storage cavity of the canister housing, and valve assembly coupling means for coupling the fuel tank isolation valve assembly directly to the canister housing.

In this way, valve housing 26 is blocked from tilting and rotating about valve axis 39A relative to storage body closure 22, thereby reducing the wear on a valve assembly seal 27 between valve housing 26 and storage body closure 22. Valve assembly seal 27 is a seal ring 27 located between storage body closure 22 and valve housing 26 to seal between storage body closure 22 and valve housing 26 once valve housing 26 is coupled to storage body closure 22 as shown in FIGS. 5-7. Valve assembly coupling means 18 allows fuel tank isolation valve assembly 16 to be directly coupled to storage body closure 22 of canister housing 12, thereby removing any pipes or hoses between fuel tank isolation valve assembly 16 and canister housing 12 to eliminate leak paths between fuel tank 17 and the engine. As valve housing 26 is directly coupled to canister housing 12, valve assembly seal 27 is located directly between valve housing 26 and storage body closure 22 to seal therebetween.

Therefore, maintaining proper engagement of valve housing 26 and storage body closure 22 with valve assembly seal 27 may be important to reduce leaks therebetween. Tilting or rotating of valve housing 26 may reduce the effectiveness of seal 27 as tilting may cause seal 27 to disengage valve housing 26/storage body closure 22 and/or may damage seal 27 over time. Fixing valve housing 26 in the predetermined position maintains valve housing 26 in proper engagement with seal 27.

Canister housing 12 is a carbon canister in the illustrative embodiment and includes carbon bed 14 in storage cavity 32 to remove hydrocarbons in the fuel vapor flowing into and out of media storage body 20. Fuel tank isolation valve assembly 16 controls the fuel vapor flowing into and out of media storage body 20, while the valve assembly coupling means 18 couples the fuel tank isolation valve assembly 16 directly to storage body closure 22 of storage body 20 so that fuel vapor flowing to and from fuel tank 17 flow directly between storage cavity 32 of media storage body 20 and vapor-transfer passageway 30 without any additional hoses or pipes.

In vehicles with a normal internal combustion engine, the fuel vapor from the fuel tank is vented directly to the surrounding atmosphere. Directly venting the fuel vapor to the surrounding atmosphere may be harmful to people and/or the environment.

However, in partially hybrid electric vehicles (PHEV), the internal combustion engine included in the vehicle operates intermittently and therefore the fuel tank system is frequently closed off from the atmosphere when not in use (i.e. the engine is not being used). Closing the system off from the atmosphere may reduce the harmful emissions to the surrounding environment, but may create a need to control/regulate the fuel vapor in the system.

The fuel vapor in the fuel tank may therefore be at a higher pressure or a lower vacuum pressure than normal engines, which may make opening fuel system lines when ready for use a challenge. Further, if the increased pressure in the fuel tank is not released, the fuel tank may become damaged or even explode.

Fuel tank systems may include a fuel tank isolation valve to control the flow fuel vapor and air between the fuel tank and a canister used to store the pressurized fuel vapor to release built up pressure in the fuel tank at different stages. The canister is configured to "clean" fuel vapor vented from the fuel tank during tank refueling. The canister may be in fluid communication with the engine, the fuel tank, and the atmosphere, which provides several leak paths for the fuel vapor.

In the illustrative embodiment, valve assembly coupling means 18, also referred to as valve mount assembly 18, couples fuel tank isolation valve assembly 16 directly to storage body closure 22 of canister housing 12, thereby removing any pipes or hoses between fuel tank isolation valve assembly 16 and canister housing 12 to eliminate leak paths between fuel tank 17 and the engine. Fuel vapor from fuel tank 17 flows through vapor port 28, through vapor-transfer passageway 30, and directly into storage cavity 32. An opening 460 to vapor-transfer passageway 30 formed by valve housing 26 opens directly into storage cavity 32 to put vapor-transfer passageway 30 in direct fluid communication with storage cavity 32.

In the illustrative embodiment, valve assembly coupling means 18 is a combination of a push on connection and a fastener connection in the illustrative embodiment. Valve housing 26 is pushed into/inserted in mount hole 22H on storage body closure 22 and valve assembly coupling means 18 fixes valve housing 26 in the predetermined position. In other embodiments, valve assembly coupling means 18 may be any one of a cam connection, a snap connection, a fastener connection including at least one of screws, bolts, and molded studs with nuts, and a threaded connection.

Valve mount assembly 18 includes a valve mount bracket 34 and fasteners 36 as shown in FIGS. 2-5. Valve mount bracket 34 extends axially away from storage body closure 22. Each fastener 36 extends through valve mount bracket 34 into valve housing 26 of fuel tank isolation valve assembly 16. Each fastener 36 extends through valve mount bracket 34 into valve housing 26 perpendicular to valve axis 39A and closure axis 22A to fix valve housing 26 in the predetermined position relative to storage body closure 22 of canister housing 12.

In the illustrative embodiment, valve mount assembly 18 includes at least three fasteners 36 as shown in FIGS. 2-5. In other embodiments, valve mount assembly 18 includes more than three fasteners 36. In other embodiments, valve mount assembly 18 includes two fasteners 36.

Figure 4:
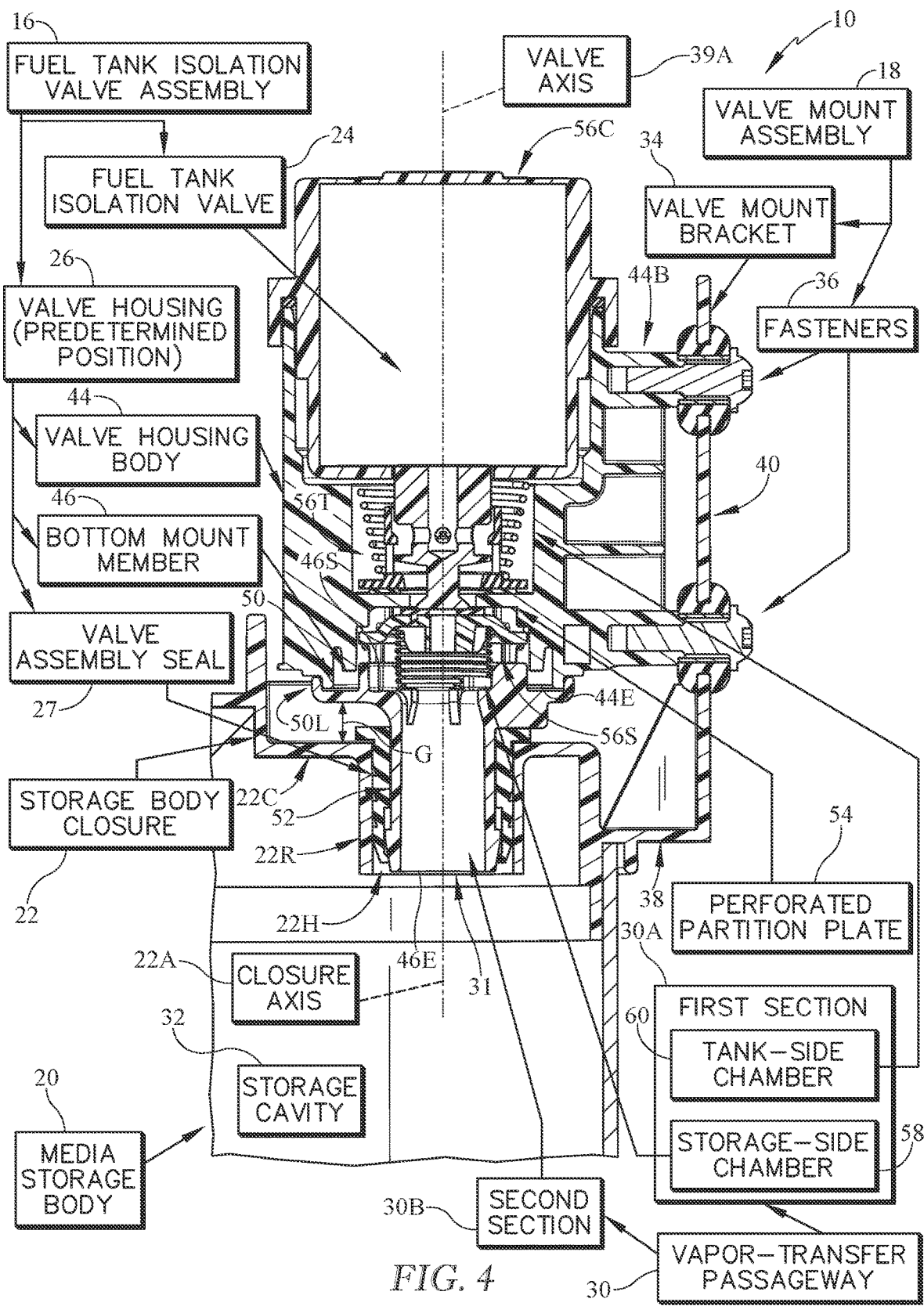
FIG. 4 is a sectional side elevation view similar to FIG. 2 showing the fasteners of the valve assembly coupling means extend through valve mount bracket on the storage body closure into the valve housing body of the valve housing to fix the valve housing is in the predetermined position so that the valve axis remains overlapped with the closure axis of the storage body closure to reduce leaks between the valve housing and the canister housing as fuel vapor flows through the vapor-transfer passageway between the fuel tank and the storage cavity of the media storage body.

Valve mount bracket 34 includes a radially-extending wall 38 and an axially-extending wall 40 as shown in FIGS. 4 and 5. Radially-extending wall 38 extends radially away from storage body closure 22. Axially-extending wall 40 extends axially from radially-extending wall 38 away from media storage body 20. In the illustrative embodiment, radially-extending wall 38 and axially-extending wall 40 of valve mount bracket 34 are integrally formed with storage body closure 22 such that valve mount bracket 34 and storage body closure 22 are a monolithic component.

To engage valve assembly coupling means 18, an inner end 46E of valve housing 26 is aligned with mount hole 22H formed in storage body closure 22. Then, inner end 46E of valve housing 26, with the valve assembly seal 27 arranged thereon, is inserted into mount hole 22H so that inner end 46E extends into mount hole 22 and valve assembly seal 27 is located between valve housing 26 and storage body closure 22. Valve housing 26 is inserted into mount hole 22H so that blind holes 44H formed in valve housing 26 align with holes 34H on valve mount bracket 34. Each fastener 36 is then inserted through a corresponding hole 34H in valve mount bracket 34 into a corresponding blind holes 44H formed in valve housing 26. Inserting fasteners 36 through valve mount bracket 34 into valve housing 26 fixes valve housing 26 in the predetermined position.

In the predetermined position, valve housing 26 is spaced apart axially from storage body closure 22 to define a gap G therebetween as shown in FIGS. 4 and 5. Gap G is annular and extends around the valve axis 39A. Valve housing 26 is blocked from tilting and rotating about valve axis 39A relative to storage body closure 22 to maintain an equal gap G. By maintaining the gap G around the valve axis 39A, wear on valve assembly seal 27 is reduced.

In the illustrative embodiment, valve axis 39A of fuel tank isolation valve assembly 16 is the same as closure axis 22A of canister housing 12. Valve mount assembly 18 fixes valve housing 26 in the predetermined position so that valve housing 26 is blocked from tilting and rotating about valve axis 39A relative to storage body closure 22 to maintain an equal gap G. In this way, valve axis 39A remains overlapped with closure axis 22A.

Figure 3:
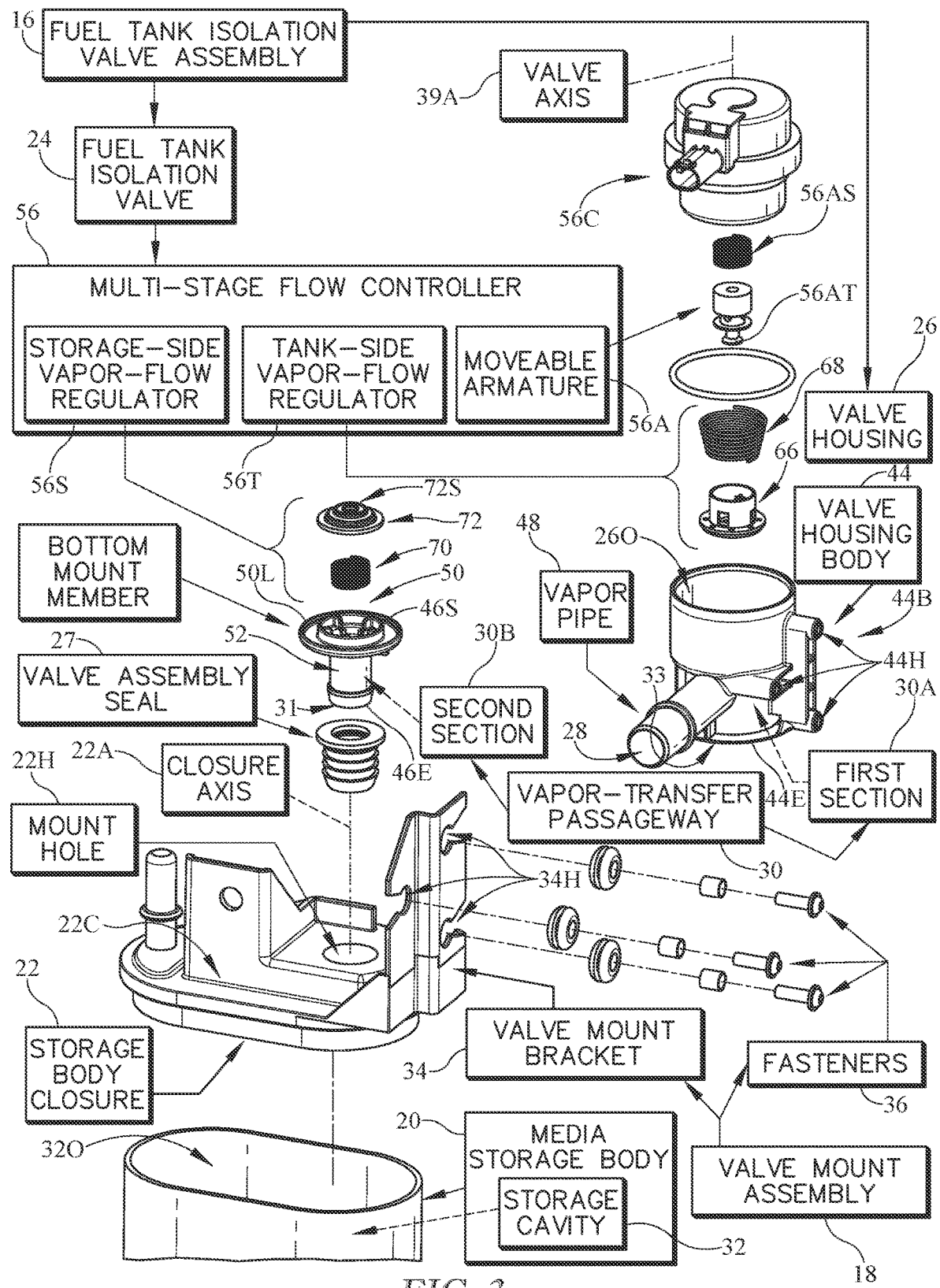
FIG. 3 is an exploded perspective view of the tank venting system of FIG. 1 showing the valve housing of the fuel tank isolation valve assembly includes a valve housing body shaped to define the fuel-tank vapor port and a portion of the vapor-transfer passageway and a bottom mount member shaped to define another portion of the vapor-transfer passageway, the bottom mount member configured to be (i) welded to the valve housing body to close a bottom opening of the valve housing body and (ii) inserted into a mount hole formed in the storage body closure so that the vapor-transfer passageway is in fluid communication with the storage cavity as shown in FIGS. 4 and 5, and further showing the valve assembly coupling means is provided by a valve mount bracket included in the storage body closure and a plurality of fasteners configured to extend through the valve mount bracket into the valve housing of the fuel tank isolation valve assembly to fix the fuel tank isolation valve assembly relative to the storage body closure in the predetermined position as shown in FIG. 4.

Inner end 46E of valve housing 26 forms an opening 31 to vapor-transfer passageway 30 as shown in FIG. 3. Once fuel tank isolation valve assembly 16 is coupled to canister housing 12, opening 31 directly opens into storage cavity 32 thereby eliminating leak paths between fuel tank 17 and the engine. Fuel vapor from fuel tank 17 flows through fuel-tank vapor port 28 through vapor-transfer passageway 30, and directly into storage cavity 32. In the illustrative embodiment, an opening 31 to vapor-transfer passageway 30 opens directly into storage cavity 32 to put vapor-transfer passageway 30 in direct fluid communication with storage cavity 32.

Fuel tank venting system 10 includes canister housing 12, fuel tank isolation valve assembly 14, and valve mount assembly 18 as shown in FIGS. 2-5. Valve mount assembly 18 fixes valve housing 26 of fuel tank isolation valve assembly 16 directly to storage body closure 22 of canister housing 12 with valve housing 26 located in the predetermined position relative to storage body closure 22 of canister housing 12.

Canister housing 12 includes media storage body 20 and storage body closure 22 as shown in FIGS. 2-5. Media storage body 20 is formed to define storage cavity 32 containing carbon bed 14 configured to absorb hydrocarbons in fuel vapor from fuel tank 17 that flows into and out of storage cavity 32 of media storage body 20. Storage body closure 22 is selectively coupled to media storage body 20 to close top opening 32O to storage cavity 32.

Storage body closure 22 is formed to include a cover panel 22C and a rim 22R as shown in FIGS. 4 and 5. Cover panel 22C is selectively coupled to media storage body 20 to close top opening 32O to storage cavity 32. Rim 22R extends axially from cover panel 22C into storage cavity 32. Rim 22R defines mount hole 22H in the illustrative embodiment. Mount hole 22H extends axially through cover panel 22C along closure axis 22A.

Fuel tank isolation valve assembly 16 includes valve housing 26, fuel tank isolation valve 24, and valve assembly seal 27 as shown in FIGS. 2-5. Fuel tank isolation valve 24 is arranged in valve housing 26. Valve assembly seal 27 is located in mount hole 22H of storage body closure 22 between valve housing 26 and storage body closure 22 to seal therebetween.

Valve housing 26 includes a valve housing body 44, a bottom mount member 46 independent of valve housing 26, and a vapor pipe 48 as shown in FIGS. 2-5. Bottom mount member 46 is coupled to an inner end 44E of valve housing body 44 to close a bottom opening 33 of valve housing body 44 to provide a shoulder surface 46S to support components of fuel tank isolation valve 24 in vapor-transfer passageway 30. Vapor pipe 48 extends radially from valve housing body 44 relative to valve axis 39A.

In the illustrative embodiment, valve housing body 44 is formed to include a mount base 44B that forms blind holes 44H for each of the fasteners 36 of the valve mount assembly 18. The mount base 44B extends radially outward from the valve housing body 44 toward the valve mount bracket 34. Fasteners 36 extend through valve mount bracket 34 into mount base 44B of valve housing body 44.

Valve housing body 44 is formed to define a first section 30A of vapor-transfer passageway 30, while bottom mount member 46 is shaped to define a second section 30B of vapor-transfer passageway 30 as shown in FIG. 4. Bottom mount member 46 closes bottom opening 33 to retain fuel tank isolation valve 24 in the first section 30A of vapor-transfer passageway 30.

Bottom mount member 46 of valve housing 26 extends into mount hole 22H formed in storage body closure 22 so that vapor-transfer passageway 30 is in fluid communication the storage cavity 32. Vapor pipe 48 is formed to define fuel-tank vapor port 28 adapted to be coupled in fluid communication with fuel tank 17. Fuel vapor from fuel tank 17 flows from fuel tank 17 through the vapor port 28, the first section 30A of vapor-transfer passageway 30, and the second section 30B of vapor-transfer passageway 30 into storage cavity 32.

In the illustrative embodiment, vapor-transfer passageway 30 extends along axis 39A of fuel tank isolation valve 24, while vapor pipe 48 extends at an angle relative to vapor-transfer passageway 30 as shown in FIGS. 4 and 5. The opening 26O of vapor-transfer passageway 30 into storage cavity 32 is aligned with axis 39A of fuel tank isolation valve 24 in the illustrative embodiment as shown in FIGS. 4 and 5.

Bottom mount member 46 is formed to include a mount plate 50 and a mount pipe 52 as shown in FIGS. 2-5. Mount plate 50 is coupled to valve housing body 44 to close bottom opening 33 of valve housing body 44. Mount pipe 52 extends axially from mount plate 50 away from valve housing body 44 into mount hole 22H formed in storage body closure 22. Mount plate 50 is shaped to define shoulder surface 46S and mount pipe 52 is formed to define the second section 30B of vapor-transfer passageway 30 in the illustrative embodiment.

In the illustrative embodiment, mount plate 50 is formed to include an annular lip 50L that extends axially away from mount plate 50 as shown in FIGS. 3-5. Annular lip 50L extends around ridges on inner end 44E of valve housing body 44 when the mount plate 50 is coupled to inner end 44E of valve housing body 44 to close bottom opening 33 of valve housing body 44.

Valve assembly seal 27 extends axially along bottom mount member 46 of valve housing 26 in the illustrative embodiment. Valve assembly seal 27 comprises nylon materials in the illustrative embodiment. Valve assembly seal 27 may be a nylon quick connect attachment.

Fuel tank isolation valve 24 regulates fuel vapor flow through vapor-transfer passageway 30 to regulate pressure of fuel vapor within fuel tank 17 in accordance with predetermined pressure targets. Fuel tank isolation valve 24 is located in the first section 30A of the vapor-transfer passageway 30 in the illustrative embodiment.

Fuel tank isolation valve 24 includes a stationary perforated partition plate 54 mounted in vapor-transfer passageway 30 and a multi-stage flow controller 56 that is mounted for movement in vapor-transfer passageway 30 alongside and relative to perforated partition plate 54 as shown in FIGS. 3-5. Multi-stage flow controller 56 is configured to regulate flow of fuel vapor through separate central and orbital vents formed in perforated partition plate 54.

Perforated partition plate 54 is arranged to divide the first section 30A of vapor-transfer passageway 30 into a storage-side chamber 58 that communicates directly with storage cavity 32 of media storage body 20 through the second section 30B of vapor-transfer passageway 30 and an overlying tank-side chamber 60 that communicates with vapor port 28 as shown in FIGS. 4 and 5. Perforated partition plate 54 is formed to include a central vent aperture 62 to establish a first vent 62 and six orbital vent apertures 64a-f (see FIG. 6) establishing a second vent 64 and surrounding the central vent aperture 62.

In the illustrative embodiment, perforated partition plate 54 is formed to include a round central vent aperture 62 centered on central vertical axis 39A and six arc-shaped orbital vent apertures 64a-f arranged to surround the round central vent aperture 62 and lie in radially spaced relation from central vertical axis 39A and circumferentially spaced-apart relation to one another. Perforated partition plate 54 is mounted in a stationary position in the vapor-transfer passageway 30 of valve housing 26.

In the illustrative embodiment, perforated partition plate 54 is arranged within the first section 30A of vapor-transfer passageway 30 defined by valve housing body 44. Bottom mount member 46 closes bottom opening 33 of valve housing 26 to define a portion of the storage-side chamber 58.

In the illustrative embodiment, valve housing body 44, vapor pipe 48, and perforated partition plate 54 are a monolithic component. Bottom mount member 46 is a separate piece that is coupled to valve housing body 44. In the illustrative embodiment, bottom mount member 46 is welded to valve housing body 44.

In the illustrative embodiment, fuel tank isolation valve 24 includes a solenoid 56 for use with multi-stage flow controller 56 as suggested in FIG. 1. The solenoid 56 may be used to control the multi-stage flow controller 56 during tank refueling activities. Solenoid 56 can be energized during different open modes of fuel tank isolation valve 24. In some embodiments, the multi-stage flow controller 56 of fuel tank isolation valve 24 may be mechanically activated using a suitable mechanical system using vacuum and pressure to control movement of the controller 56.

Perforated partition plate 54 of fuel tank isolation valve 24 is located in vapor-transfer passageway 30 formed in valve housing 26 as shown in FIGS. 4 and 5. Perforated partition plate 54 partitions vapor-transfer passageway 30 to define a tank-side chamber 60 above perforated partition plate 54 for conducting fuel vapor between the vapor port 28 and the center and orbital vents 62, 64 formed in perforated partition plate 54 and a storage-side chamber 58 below perforated partition plate 54 for conducting fuel vapor between the storage cavity 32 of media storage body 20 and the center and orbital vents 62, 64.

Multi-stage flow controller 56 is configured normally to engage perforated partition plate 54 to close the first and second vents 62, 64 formed in perforated partition plate 54 so as to block fuel vapor flow from vapor port 28 to storage cavity 32 through the vapor-transfer passageway 30 formed by valve housing 26 so that fuel tank 17 is normally isolated from fluid communication with storage cavity 32 of media storage body 20. However, multi-stage flow controller 56 is configured in to disengage from perforated partition plate 54 in several different ways so as to regulate flow of fuel vapor in vapor-transfer passageway 30 between fuel tank 17 and storage cavity 32 of media storage body 20 independently through central vent aperture 62 and also through several orbital vent apertures 64a-f during (1) early and later stages of fuel tank refueling activity, (2) development of unwanted vacuum conditions in fuel tank 17, and (3) development of unwanted over-pressure conditions in fuel tank 17.

Multi-stage flow controller 56 includes a tank-side vapor-flow regulator 56T and a storage-side vapor-flow regulator 56S as suggested in FIGS. 3 and 4. Tank-side vapor-flow regulator 56T is located above perforated partition plate 54 in tank-side chamber 60 that is formed in the vapor-transfer passageway 30 to communicate fuel vapor to and from fuel tank 17 via vapor port 28 coupled to fuel tank 17. Storage-side vapor-flow regulator 56S is located under perforated partition plate 54 in the storage-side chamber 58 that is formed in vapor-transfer passageway 30 to communicate fuel vapor to and from storage cavity 32 of media storage body 20. Each of tank-side and storage-side vapor-flow regulators 56T, 56S is aligned to move upwardly and downwardly relative to perforated partition plate 54 along a single vertical axis 39A that extends through the vapor-transfer passageway 30.

Multi-stage flow controller 56 also includes a spring-biased movable armature 56A that is operationally coupled to solenoid 56 and is arranged to extend into the vapor-transfer passageway 30 as shown in FIG. 5. Movable armature 56A moves relative to the stationary perforated partition plate 54 along the single vertical axis 39A that extends through the tank-side chamber 60, the central vent aperture 62 formed in perforated partition plate 54, and the storage-side chamber 58. Movable armature 56A cooperates with tank-side and storage-side vapor-flow regulators 56T, 56S when fuel tank isolation valve 24 is in a normal CLOSED mode to block flow of fuel vapor through the central and orbital vent apertures 62, 64 formed in perforated partition plate 54 so that fuel vapor cannot flow through the vapor-transfer passageway 30 between fuel tank 17 and storage cavity 32 of media storage body 20 and therefore fuel tank 17 normally is isolated from the media storage body 20.

Tank-side and storage-side vapor-flow regulators 56T, 56S are configured to move in the vapor-transfer passageway 30 relative to the stationary perforated partition plate 54 to close, partly open, and open vents 62, 64 formed in perforated partition plate 54 in response to changes in pressure of fuel vapor extant in the vapor-transfer passageway 30 and in fuel tank 17. Movable armature 56A is spring-biased normally to move toward storage-side vapor-flow regulator 56S and is operationally linked to solenoid 56 to move upwardly away from storage-side vapor-flow regulator 56S when solenoid 56 is energized. Movable armature 56A includes a distal tip 56AT that is arranged to extend into the vapor-transfer passageway 30 and move therein in response to a pushing force generated by an armature-biasing spring 56AS and actuation of solenoid 56 to assume various positions therein to cooperate with storage-side vapor-flow regulator 56S so as to close or partly open the central vent 62 formed in the perforated partition plate 54.

As mentioned above, fuel tank isolation valve 24 may be important to regulate the pressure of fuel vapor in the system of hybrid vehicles. Fuel tank isolation valve 24 is normally closed to block the flow of fuel vapor from tank 17 to media storage body 20 as shown in FIG. 5. Fuel tank isolation valve 24 has different open modes to regulate the flow of fuel vapor between fuel tank 17 and media storage body 20 based on different conditions of the system.

In the case of over-pressure conditions, fuel tank isolation valve 24 changes to one of the open modes to allow a release a large amount of pressure from fuel tank 17. Conversely, if there is vacuum conditions in fuel tank 17, fuel tank isolation valve 24 may change to another opened mode to alleviate unwanted vacuum conditions. Once the vehicle switches to using engine, fuel tank isolation valve 24 may change to one of open modes to allow the fuel vapor to flow from fuel tank 17 through media storage body 20 and to the engine to be burned with the fuel.

Releasing the built up pressure of the fuel vapor in the fuel tank may also be important during refueling of the fuel tank. When a person uses a fuel-dispersion pump nozzle to begin to discharge fuel into a filler neck leading to the fuel tank, fuel tank isolation valve 24 changes from closed mode to first opened mode to vent some displaced fuel vapor from fuel tank 17. After refueling begins and fuel is being discharged at a constant rate into fuel tank 17, fuel tank isolation valve 24 changes to second opened mode to vent more displaced fuel vapor.

As suggested in FIG. 3, fuel tank isolation valve 24 comprises a perforated partition plate 54, a multi-stage flow controller 56, and an armature-biasing solenoid 56. Multi-stage flow controller 56 includes a tank-side vapor-flow regulator 56T comprising a top hat-shaped spring cap 66 and a large-diameter compression (vacuum) spring 68; a movable armature 56A; and a storage-side vapor-flow regulator 56S comprising a narrow-diameter compression (pressure) spring 70 and a spring cap 72.

Bottom mount member 46 is coupled to bottom opening 33 of valve housing body 44 to retain multi-stage flow controller 56 in the first section 30A of vapor-transfer passageway 30. Bottom mount member 46 provides shoulder surface 46S engaged by other components of fuel tank isolation valve 24 to retain fuel tank isolation valve 24 in the vapor-transfer passageway 30.

Bottom mount member 46 coupled to valve housing body 44 below compression spring 70 and spring cap 72 so that the spring 70 engages with the bottom mount member 46 to bias the spring cap 72 with the O-ring seal 72S into engagement with the underside of perforated partition plate 54. Bottom mount member 46 is shaped to define the second section 30B of vapor-transfer passageway 30 so as to allow pressurized fuel vapor to flow through bottom mount member 46.

As suggested in FIG. 3, movable armature 56A, spring 56AS, and tank-side vapor-flow regulator 56T included in fuel tank isolation valve 24 have been installed in the tank-side chamber 60 of the vapor-transfer passageway 30, while storage-side vapor-flow regulator 56S has been installed in the storage-side chamber 58. Movable armature 56A, spring 56AS, and tank-side vapor-flow regulator 56T are installed in tank-side chamber 60 of the vapor-transfer passageway 30 through an opening 26O in valve housing 26. Top-side vapor-transfer passageway closure 56C is then attached to valve housing 26 to close tank-side chamber 60 of vapor-transfer passageway 30.

The installation of movable armature 56A, spring 56AS, and tank-side vapor-flow regulator 56T causes a downwardly extending tip 56AT of movable armature 56A to extend along the single vertical axis 39A into the first vent 62 established by central vent aperture 62 and formed in perforated partition plate 54. The installation of movable armature 56A, spring 56AS, and tank-side vapor-flow regulator 56T also causes seal ring 66S of tank-side vapor-flow regulator 56T to engage an annular outer perimeter region of topside of perforated partition plate 54 to block fuel vapor from passing through the second vent 64 established by six orbital vent apertures 64a-f (see FIG. 6) surrounding the central vent aperture 62. The round central vent aperture 62 and the six surrounding circumferentially spaced-apart arcuate orbital vent apertures 64a-f formed in perforated partition plate 54 of fuel tank isolation valve 24 are shown for example in FIG. 5B.

Storage-side vapor-flow regulator 56S is installed through opening 33 of valve housing body 44. Spring cap 72 and spring 70 are inserted into the storage-side chamber 58 and bottom mount member 46 is then coupled to valve housing body 44 to close bottom opening 33. The installation of storage-side vapor-flow regulator 56S causes O-ring seal 72S of storage-side vapor-flow regulator 56S to engage the downwardly facing surface on distal tip 56AT of movable armature 56A and the downwardly facing surface on the annular inner perimeter region of underside of perforated partition plate 54 that surrounds the central vent aperture 62.

In the illustrative embodiment, fuel tank venting system 10 includes canister housing 12, fuel tank isolation valve assembly 16, and valve assembly coupling means 18 for coupling fuel tank isolation valve assembly 16 directly to canister housing 12. Canister housing 12 includes media storage body 20 formed to define storage cavity 32 containing carbon bed 14 configured to absorb hydrocarbons in fuel vapor from fuel tank 17 that flows into and out of storage cavity 32 of media storage body 20.

Fuel tank isolation valve assembly 16 includes valve housing 26 and fuel tank isolation valve 24. Valve housing 26 is formed to define fuel-tank vapor port 28 adapted to be coupled in fluid communication with fuel tank 17 and vapor-transfer passageway 30 in fluid communication with fuel-tank vapor port 28. Fuel tank isolation valve 24 is located in vapor-transfer passageway 30 and is configured to regulate the flow of fuel vapor between fuel tank 17 and storage cavity 32.

Fuel tank venting system 10 includes valve assembly coupling means 18 for coupling fuel tank isolation valve assembly 16 directly to canister housing 12 to cause vapor-transfer passageway 30 of valve housing 26 to be in fluid communication with storage cavity 32 of canister housing 12 so that fuel vapor flows directly between fuel tank 17 and storage cavity 32 of media storage body 20 when fuel tank isolation valve 24 is in one of the different open modes.

Another embodiment of a fuel tank venting system 210 in accordance with the present disclosure is shown in FIGS. 6-10B. The fuel tank venting system 210 is substantially similar to fuel tank venting system 10 shown in FIGS. 1-5B and described herein. Accordingly, similar reference numbers in the 200 series indicate features that are common between fuel tank venting system 10 and fuel tank venting system 210. The description of fuel tank venting system 10 is incorporated by reference to apply to fuel tank venting system 210, except in instances when it conflicts with the specific description and the drawings of fuel tank venting system 210.

Fuel tank venting system 210 comprises a canister housing 212 having a media storage body 220 and a storage body closure 222, a fuel tank isolation valve assembly 216, and valve assembly coupling means 218 for coupling the fuel tank isolation valve assembly 216 directly to the storage body closure 222 as shown in FIGS. 6-10. Storage body closure 222 includes a mount hole 222H that extends axially along a closure axis 222A. Fuel tank isolation valve assembly 16 includes a fuel tank isolation valve 24 to regulate flow of fuel vapor between a fuel tank 217 and storage cavity 232 of canister housing 212.

Valve assembly coupling means 218, also referred to as valve mount assembly 218 is substantially similar to valve mount assembly 18 as shown in FIGS. 1-5. However, valve mount assembly 218 couples the fuel tank isolation valve assembly 216 farther above storage body closure 222 because a valve housing 226 of fuel tank isolation valve assembly 216 has an elongated vapor-transfer passageway 230 as shown in FIGS. 7 and 9.

Valve housing 226 is formed to define a fuel-tank vapor port 228 and vapor-transfer passageway 230. Vapor-transfer passageway 230 is in fluid communication with fuel-tank vapor port 228 and extends axially along a valve axis 239A. Fuel tank isolation valve 224 is located in vapor-transfer passageway 230 to regulate flow of fuel vapor between fuel tank 217 and storage cavity 232.

Valve housing 226 includes a valve housing body 244, a bottom mount member 246 independent of valve housing 226, and a vapor pipe 248 as shown in FIGS. 7-10. Bottom mount member 246 is coupled to valve housing body 244 to close bottom opening 233 of valve housing body 244 to provide a shoulder surface 246S to support components of fuel tank isolation valve 224 in vapor-transfer passageway 230. Vapor pipe 248 extends radially from valve housing body 244 relative to valve axis 239A.

Figure 9:
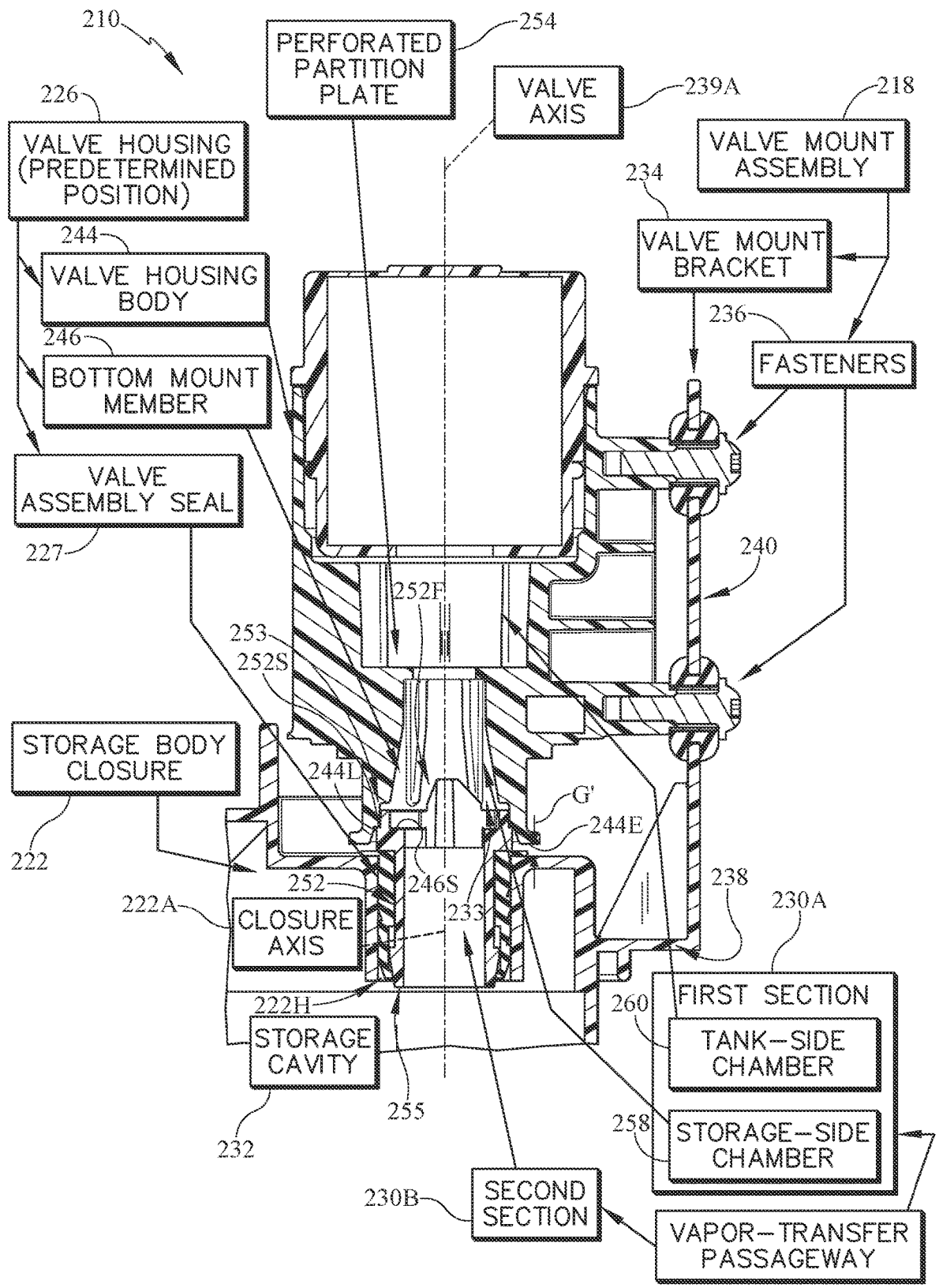
FIG. 9 is a sectional side elevation view similar to FIG. 7 showing the fasteners of the valve assembly coupling means extend through valve mount bracket on the storage body closure into the valve housing body of the valve housing to fix the valve housing is in the predetermined position so that the valve axis remains overlapped with the closure axis of the storage body closure to reduce leaks between the valve housing and the canister housing as fuel vapor flows through the vapor-transfer passageway between the fuel tank and the storage cavity of the media storage body.
Figure 10:
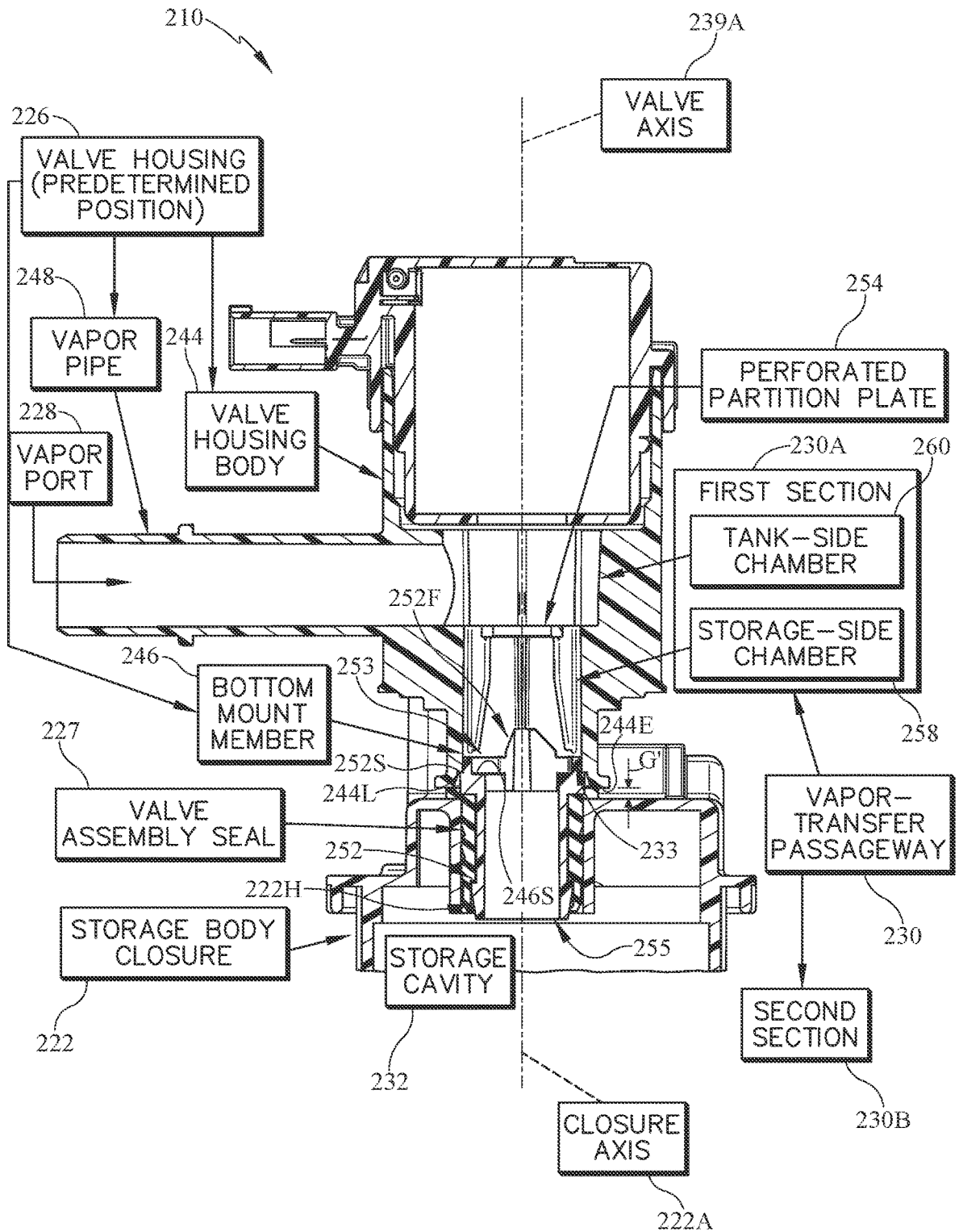
FIG. 10 is a sectional side elevation view of FIG. 6 taken along line 10-10 showing the fuel tank isolation valve includes a perforated partition plate that divides the vapor-transfer passageway to form a tank-side chamber that opens directly into the fuel-tank vapor port and a storage-side chamber that opens into the storage cavity of the media storage body, the storage-side chamber is elongated compared to the embodiment in FIGS. 1-5, and further showing the bottom mount member of the valve housing includes a mount pipe that extends axially relative to the valve axis between the first end and the second end and a plurality of flow dividers coupled to the first end of the mount pipe.

Valve housing body 244 is formed to define a first section 230A of vapor-transfer passageway 230, while bottom mount member 246 is shaped to define a second section 230B of vapor-transfer passageway 230 as shown in FIGS. 9 and 10. Bottom mount member 246 closes bottom opening 233 to retain fuel tank isolation valve 224 in the first section 230A of vapor-transfer passageway 230.

In the illustrative embodiment, the first section 230A of vapor-transfer passageway 230 is elongated compared to the first section 30A of vapor-transfer passageway 230 in FIGS. 1-5. As a result, valve housing body 244 is longer compared to valve housing body 44. Bottom mount member 46 of valve housing 26 allows the overall height of valve housing 26 to be reduce, thereby reducing the space claim of fuel tank isolation valve assembly 16.

Bottom mount member 246 of valve housing 226 extends into mount hole 222H formed in storage body closure 222 so that vapor-transfer passageway 230 is in fluid communication the storage cavity 232. Vapor pipe 248 is formed to define fuel-tank vapor port 228 adapted to be coupled in fluid communication with fuel tank 217. Fuel vapor from fuel tank 217 flows from fuel tank 217 through the vapor port 228, the first section 230A of vapor-transfer passageway 230, and the second section 230B of vapor-transfer passageway 230 into storage cavity 232.

Bottom mount member 246 is formed to include a mount pipe 252 and a plurality of flow dividers 252F as shown in FIGS. 7-10. Mount pipe 252 extends axially relative to the valve axis 239A between a first end 253 coupled to valve housing body 244 to close bottom opening 233 of valve housing body 244 and a second end 255 spaced apart axially from the first end 253. Flow dividers 252F are coupled to the first end 253 of mount pipe 252.

Mount pipe 252 is shaped to define the second section 230B of vapor-transfer passageway 230 as shown in FIGS. 9 and 10. Flow dividers 252F divide an opening formed by the first end 253 of mount pipe 252 as shown in FIG. 10B. Each flow divider 252F extends radially inward from mount pipe 252 and meets at valve axis 239A as shown in FIG. 10B.

In the illustrative embodiment, the first end 253 of mount pipe 252 defines shoulder surface 246S as shown in FIGS. 9 and 10. Bottom mount member 246 extends into mount hole 222H formed in storage body closure 222 so that vapor-transfer passageway 230 is in fluid communication with storage cavity 232. Shoulder surface 246S is engaged by components of fuel tank isolation valve 224 to retain fuel tank isolation valve 224 in the first section 230A of vapor-transfer passageway 230. Shoulder surface 246S is on a radially inward side of mount pipe 252.

The first end 253 of mount pipe 252 also defines a ridge surface 252S that engages a lip 244L defined by valve housing body 244 as shown in FIGS. 9 and 10. Ridge surface 252S is on a radially outward side of mount pipe 252. Bottom mount member 246 extends into mount hole 222H formed in storage body closure 222 so that ridge surface 252S of mount pipe 252 engages with lip 244L of valve housing body 244 to axially locate mount pipe 252 relative to valve housing body 244.

Valve assembly seal 227 extends axially along mount pipe 252 of bottom mount member 246 in the illustrative embodiment. Inner end 244E of valve housing 226 engages a portion of valve assembly seal 227.

Valve mount assembly 218 fixes valve housing 226 of fuel tank isolation valve assembly 216 directly to storage body closure 222 of canister housing 212 with valve housing 226 located in the predetermined position relative to storage body closure 222 of canister housing 212 as shown in FIGS. 6-10. In the predetermined position, valve housing 226 extends into mount hole 222H formed in storage body closure 222 to cause vapor-transfer passageway 230 of valve housing 226 to be in fluid communication with storage cavity 232 of canister housing 212, while also causing valve axis 239A of fuel tank isolation valve assembly 216 to overlap with closure axis 222A of storage body closure 222.

In this way, valve housing 226 is blocked from tilting and rotating about valve axis 239A relative to storage body closure 222, thereby reducing the wear on valve assembly seal 227 between valve housing 226 and storage body closure 222. Valve mount assembly 218 allows fuel tank isolation valve assembly 216 to be directly coupled to storage body closure 222 of canister housing 212, thereby removing any pipes or hoses between fuel tank isolation valve assembly 216 and canister housing 212 to eliminate leak paths between fuel tank 217 and the engine.

As valve housing 226 is directly coupled to canister housing 212, valve assembly seal 227 is located directly between valve housing 226 and storage body closure 222 to seal therebetween. Valve mount assembly 218 fixes valve housing 226 of fuel tank isolation valve assembly 216 directly to storage body closure 222 of canister housing 212 with valve housing 226 located in the predetermined position relative to storage body closure 222.

In the predetermined position, valve housing 226 is spaced apart axially from storage body closure 222 to define a gap G' therebetween as shown in FIGS. 9 and 10. Gap G' is annular and extends around the valve axis 239A. Valve housing 226 is blocked from tilting and rotating about valve axis 239A relative to storage body closure 222 to maintain an equal gap G'. By maintaining the gap G' around the valve axis 239A, wear on valve assembly seal 227 is reduced.

Figure 10A:
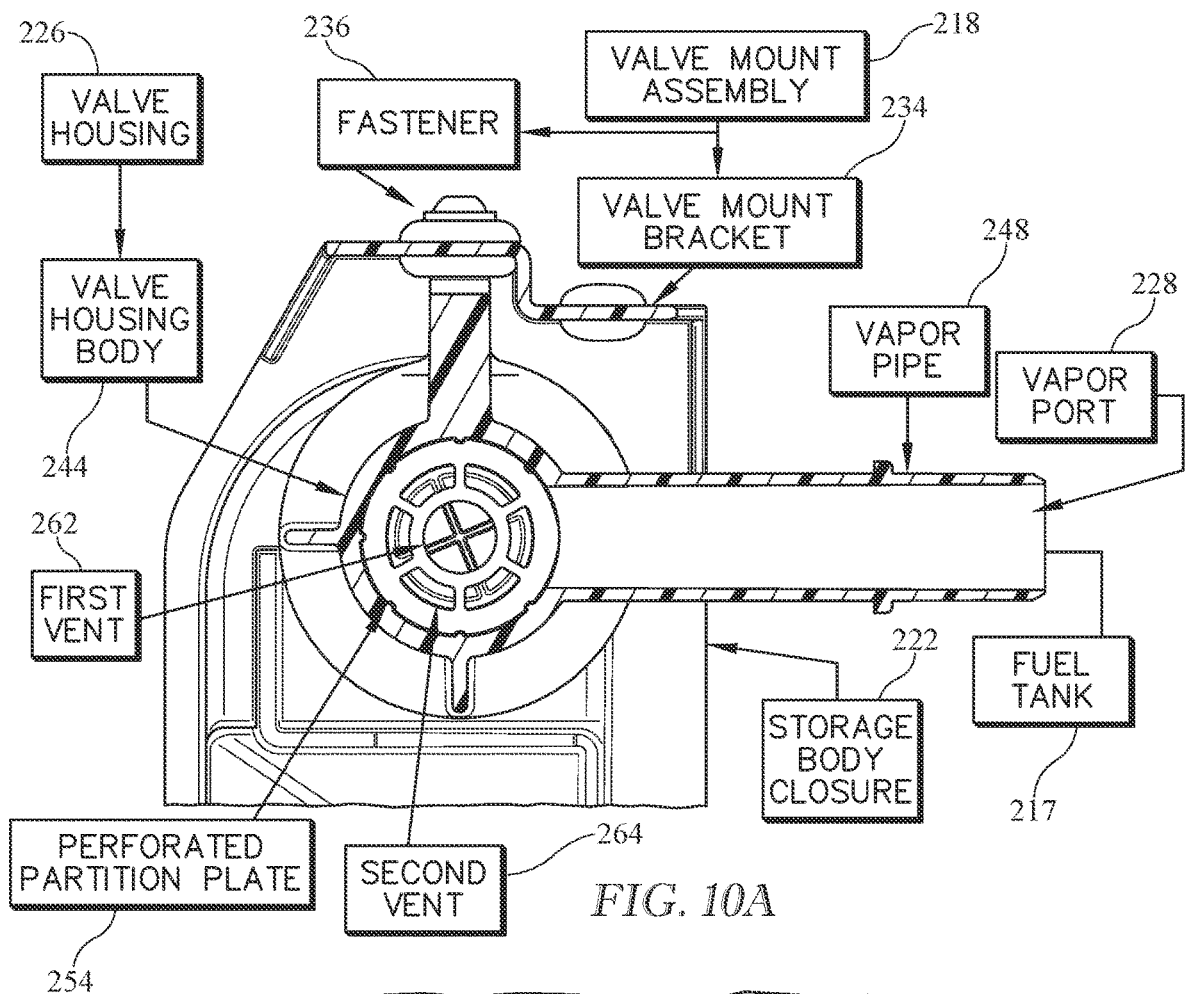
FIG. 10A is an enlarged sectional view taken along line 10A-10A of FIG. 6 showing that the stationary perforated partition plate is formed to include a large-diameter central vent aperture establishing the first vent and six relatively smaller oblong arc-shaped orbital vent apertures surrounding the central vent aperture and establishing the second vent, and further showing the bottom mount member includes flow dividers.
Figure 10B:
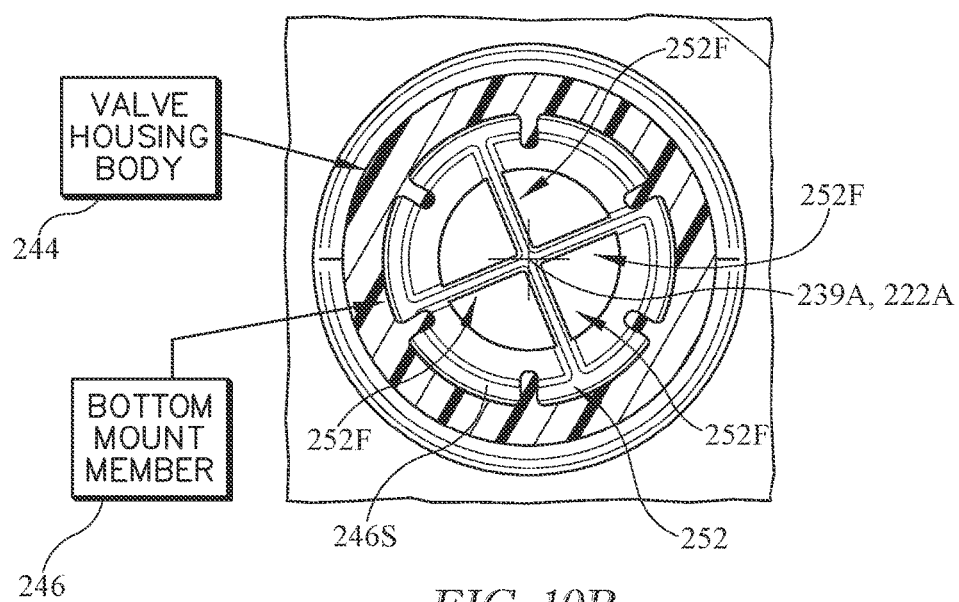
FIG. 10B is an enlarged sectional view taken along line 10B-10B of FIG. 6 showing each of the flow dividers included in the bottom mount member extend radially inward from the mount pipe so that the flow dividers meet at the valve axis to divide an opening formed by the first end of the mount pipe.

Fuel tank isolation valve 224 includes a stationary perforated partition plate 254 mounted in vapor-transfer passageway 230 as shown in FIGS. 9-10A and a multi-stage flow controller (not shown). Perforated partition plate 254 is arranged to divide the first section 230A of vapor-transfer passageway 230 into a storage-side chamber 258 that communicates directly with storage cavity 232 of media storage body 220 through the second section 230B of vapor-transfer passageway 230 and an overlying tank-side chamber 260 that communicates with vapor port 228 as shown in FIGS. 9 and 10. Perforated partition plate 254 is formed to include a central vent aperture 262 to establish a first vent 262 and six orbital vent apertures 264 establishing a second vent 264 and surrounding the central vent aperture 262.

In the illustrative embodiment, perforated partition plate 254 is arranged within the first section 230A of vapor-transfer passageway 230 defined by valve housing body 244. Bottom mount member 246 closes bottom opening 233 of valve housing 226 to define a portion of the storage-side chamber 258. Storage-side chamber 258 is elongated compared to storage-side chamber 58 in FIGS. 1-5.

In the illustrative embodiment, valve housing body 244, vapor pipe 248, and perforated partition plate 254 are a monolithic component. Bottom mount member 246 is a separate piece that is coupled to valve housing body 244. In the illustrative embodiment, bottom mount member 46 is welded to valve housing body 244.

The invention claimed is:

1. A fuel tank venting system comprising
   a canister housing including a media storage body formed to define a storage cavity containing a carbon bed configured to absorb hydrocarbons in fuel vapor from a fuel tank that flows into and out of the storage cavity of the media storage body and a storage body closure selectively coupled to the media storage body to close a top opening to the storage cavity, the storage body closure formed to include a mount hole that extends axially through the storage body closure along a closure axis,
   a fuel tank isolation valve assembly including a valve housing, a fuel tank isolation valve arranged in the valve housing, and a valve assembly seal located in the mount hole of the storage body closure between the valve housing and the storage body closure of the canister housing to seal therebetween, the valve housing formed to define a fuel-tank vapor port adapted to be coupled in fluid communication with the fuel tank and a vapor-transfer passageway in fluid communication with the fuel-tank vapor port that extends axially relative to a valve axis, and the fuel tank isolation valve located in the vapor-transfer passageway and configured to regulate the flow of fuel vapor between the fuel tank and the storage cavity, and
   valve assembly coupling means for fixing the valve housing of the fuel tank isolation valve assembly directly to the storage body closure of the canister housing with the valve housing located in a predetermined position relative to the storage body closure of the canister housing in which the valve housing extends into the mount hole of the storage body closure to cause the vapor-transfer passageway of the valve housing to be in fluid communication with the storage cavity of the canister housing and the valve axis of the fuel tank isolation valve assembly to overlap with the closure axis of the storage body closure so that the valve housing is blocked from tilting and rotating about the valve axis relative to the storage body closure to reduce wear on the valve assembly seal between the valve housing and the storage body closure,
   wherein the valve assembly coupling means includes a valve mount bracket that extends axially away from the storage body closure and a plurality of fasteners that extend through the valve mount bracket into the valve housing of the fuel tank isolation valve assembly perpendicular to the valve axis and the closure axis to fix the valve housing in the predetermined position relative to the storage body closure of the canister housing.

2. The fuel tank venting system of claim 1, wherein the valve axis of the fuel tank isolation valve assembly is coaxial with the closure axis of the canister housing.

3. The fuel tank venting system of claim 2, wherein the valve housing of the fuel tank isolation valve assembly includes a valve housing body and a bottom mount member independent of the valve housing and coupled to the valve housing body to close a bottom opening of the valve housing body, the valve housing body shaped to define the fuel-tank vapor port and a first section of the vapor-transfer passageway, and the bottom mount member shaped to define a second section of the vapor-transfer passageway and a shoulder surface engaged by part of the fuel tank isolation valve to retain the fuel tank isolation valve in the first section of the vapor-transfer passageway, and wherein the bottom mount member extends into the mount hole formed in the storage body closure so that the vapor-transfer passageway is in fluid communication with the storage cavity.

4. The fuel tank venting system of claim 3, wherein the bottom mount member of the valve housing includes a mount plate coupled to the valve housing body to close the bottom opening of the valve housing body and a mount pipe that extends axially from the mount plate away from the valve housing body into the mount hole formed in the storage body closure, the mount plate shaped to define the shoulder surface, and the mount pipe formed to define the second section of the vapor-transfer passageway.

5. The fuel tank venting system of claim 3, wherein the bottom mount member of the valve housing includes a mount pipe that extends axially relative to the valve axis between a first end coupled to the valve housing body to close the bottom opening of the valve housing body and a second end spaced apart axially from the first end and a plurality of flow dividers coupled to the first end of the mount pipe, the mount pipe shaped to define the second section of the vapor-transfer passageway, and the first end of the mount pipe shaped to define the shoulder surface.

6. The fuel tank venting system of claim 1, wherein the valve housing of the fuel tank isolation valve assembly includes a valve housing body and a bottom mount member coupled to the valve housing body to close a bottom opening of the valve housing body to provide a shoulder surface to support part of the fuel tank isolation valve in the vapor-transfer passageway, the valve housing body shaped to define the fuel-tank vapor port and a first section of the vapor-transfer passageway, and the bottom mount member shaped to define a second section of the vapor-transfer passageway, and wherein the bottom mount member extends axially into the mount hole formed in the storage body closure so that the vapor-transfer passageway is in fluid communication with the storage cavity.

7. The fuel tank venting system of claim 6, wherein the valve assembly seal extends axially along the bottom mount member of the valve housing.

8. A fuel tank venting system comprising
a canister housing including a media storage body formed to define a storage cavity and a storage body closure selectively coupled to the media storage body to close a top opening to the storage cavity, the storage body closure formed to include a mount hole that extends axially through the storage body closure relative to a closure axis,
a fuel tank isolation valve assembly including a valve housing and a fuel tank isolation valve arranged in the valve housing, the valve housing formed to define a fuel-tank vapor port adapted to be coupled in fluid communication with the fuel tank and a vapor-transfer passageway in fluid communication with the fuel-tank vapor port that extends axially relative to a valve axis, and the fuel tank isolation valve located in the vapor-transfer passageway and configured to regulate the flow of fuel vapor between the fuel tank and the storage cavity, and
a mount assembly configured to couple the valve housing of the fuel tank isolation valve assembly directly to the storage body closure of the canister housing to cause the valve housing to be fixed in a predetermined position relative to the storage body closure of the canister housing in which the valve housing is located in the mount hole of the storage body closure to cause the vapor-transfer passageway of the valve housing to be in fluid communication with the storage cavity of the canister housing and the valve axis of the fuel tank isolation valve assembly overlaps the closure axis of the storage body closure so that the valve housing is blocked from tilting and rotating about the valve axis relative to the storage body closure,
wherein the mount assembly includes a valve mount bracket that extends axially away from the storage body closure and a plurality of fasteners that extend through the valve mount bracket into the valve housing of the fuel tank isolation valve assembly to fix the valve housing in the predetermined position relative to the storage body closure of the canister housing.

9. The fuel tank venting system of claim 8, wherein the valve axis of the fuel tank isolation valve assembly is coaxial with the closure axis of the canister housing.

10. The fuel tank venting system of claim 9, wherein the plurality of fasteners extend through the valve mount bracket into the valve housing of the fuel tank isolation valve assembly perpendicular to the valve axis and the closure axis.

11. The fuel tank venting system of claim 9, wherein the valve housing of the fuel tank isolation valve assembly includes a valve housing body and a bottom mount member coupled to the valve housing body to close a bottom opening of the valve housing body to provide a shoulder surface to support part of the fuel tank isolation valve in the vapor-transfer passageway, the valve housing body shaped to define the fuel-tank vapor port and a first section of the vapor-transfer passageway, and the bottom mount member shaped to define a second section of the vapor-transfer passageway, and wherein the bottom mount member extends axially into the mount hole formed in the storage body closure so that the vapor-transfer passageway is in fluid communication with the storage cavity.

12. The fuel tank venting system of claim 8, wherein the plurality of fasteners extend through the valve mount bracket into the valve housing of the fuel tank isolation valve assembly perpendicular to the valve axis.

13. The fuel tank venting system of claim 8, wherein the valve housing of the fuel tank isolation valve assembly includes a valve housing body and a bottom mount member coupled to the valve housing body to close a bottom opening of the valve housing body to provide a shoulder surface to support part of the fuel tank isolation valve in the vapor-transfer passageway, the valve housing body shaped to define the fuel-tank vapor port and a first section of the vapor-transfer passageway, and the bottom mount member shaped to define a second section of the vapor-transfer passageway, and wherein the bottom mount member extends axially into the mount hole formed in the storage body closure so that the vapor-transfer passageway is in fluid communication with the storage cavity.

14. The fuel tank venting system of claim 13, wherein the bottom mount member of the valve housing includes a mount plate coupled to the valve housing body to close the bottom opening of the valve housing body and a mount pipe that extends axially from the mount plate away from the valve housing body into the mount hole formed in the storage body closure, the mount plate shaped to define the shoulder surface, and the mount pipe formed to define the second section of the vapor-transfer passageway.

15. The fuel tank venting system of claim 13, wherein the bottom mount member of the valve housing includes a mount pipe that extends axially relative to the valve axis between a first end coupled to the valve housing body to close the bottom opening of the valve housing body and a second end spaced apart axially from the first end and a plurality of flow dividers coupled to the first end of the mount pipe, the mount pipe shaped to define the second section of the vapor-transfer passageway, and the first end of the mount pipe shaped to define the shoulder surface.

16. The fuel tank venting system of claim 8, wherein the fuel tank isolation valve assembly further includes a valve assembly seal located in the mount hole of the storage body closure between the valve housing and the storage body closure of the canister housing to seal therebetween.

\* \* \* \* \*